US009126473B2

(12) United States Patent
Ojima

(10) Patent No.: US 9,126,473 B2
(45) Date of Patent: Sep. 8, 2015

(54) VEHICLE WINDOW SHADE APPARATUS

(75) Inventor: Shinya Ojima, Settsu (JP)

(73) Assignee: ASHIMORI INDUSTRY CO., LTD., Osaka-shi (JP)

( * ) Notice: Subject to any disclaimer, the term of this patent is extended or adjusted under 35 U.S.C. 154(b) by 171 days.

(21) Appl. No.: 13/991,508

(22) PCT Filed: Dec. 20, 2011

(86) PCT No.: PCT/JP2011/079482
§ 371 (c)(1),
(2), (4) Date: Jun. 4, 2013

(87) PCT Pub. No.: WO2012/090784
PCT Pub. Date: Jul. 5, 2012

(65) Prior Publication Data
US 2013/0255892 A1    Oct. 3, 2013

(30) Foreign Application Priority Data

Dec. 28, 2010  (JP) .................................. 2010-292099
Oct. 28, 2011  (JP) .................................. 2011-236999

(51) Int. Cl.
*A47H 1/00* (2006.01)
*B60J 1/20* (2006.01)

(52) U.S. Cl.
CPC .............. *B60J 1/2013* (2013.01); *B60J 1/2022* (2013.01); *B60J 1/2055* (2013.01); *B60J 1/2072* (2013.01); *B60J 1/2083* (2013.01)

(58) Field of Classification Search
CPC ........ B60J 1/2013; B60J 1/2022; B60J 1/205; B60J 1/2072; B60J 1/2083; B60J 1/2075; B60J 1/2086
USPC ............ 160/370.22, 120, 122, 265; 296/97.4, 296/97.8, 97.9
See application file for complete search history.

(56) References Cited

U.S. PATENT DOCUMENTS 600,306 A  *  3/1898  Decker ........................... 160/81
4,607,676 A     8/1986  Clauss
(Continued)

FOREIGN PATENT DOCUMENTS

CN   101120856 A   2/2008
CN   101264728 A   9/2008
(Continued)

OTHER PUBLICATIONS

Childs, Peter R.N.. (2004). Mechanical Design (2nd Edition). Elsevier. Online version available at: http://app.knovel.com/hotlink/toc/id:kpMDE00001/mechanical-design-2nd/mechanical-design-2nd.*

(Continued)

*Primary Examiner* — Katherine Mitchell
*Assistant Examiner* — Abe Massad
(74) *Attorney, Agent, or Firm* — Oblon, McClelland, Maier & Neustadt, L.L.P.

(57) ABSTRACT

A window shade device includes a windup device that winds up a window shade to be drawn/housed, a guide and support mechanism that includes a guide rail including a guide path and a movable member configured to move along the guide rail, and an arm that is coupled to the window shade and is supported by the movable member so as to change its posture. A first gear is provided to the arm, and a second gear is provided to at least a part of the guide path. A deceleration gear mechanism configured to mesh with the first gear and the second gear decelerates and transfers the rotational movement upon meshing with the second gear as the rotational movement for causing the arm to change its posture upon meshing with the first gear.

10 Claims, 30 Drawing Sheets

(56) References Cited

U.S. PATENT DOCUMENTS

| | | | |
|---|---|---|---|
| 6,047,762 | A | 4/2000 | Anderson et al. |
| 6,834,705 | B2 * | 12/2004 | Seel .................... 160/370.22 |
| 6,910,518 | B2 * | 6/2005 | Zimmermann et al. . 160/370.22 |
| 7,347,246 | B2 | 3/2008 | Ayran |
| 7,455,345 | B1 * | 11/2008 | Kim .............................. 296/97.4 |
| 7,828,040 | B2 * | 11/2010 | Miyachi et al. .......... 160/370.22 |
| 7,857,035 | B2 * | 12/2010 | Miyachi et al. .......... 160/370.22 |
| 7,934,764 | B2 * | 5/2011 | Hansen ....................... 296/97.8 |
| 2005/0126724 | A1 * | 6/2005 | Ayran ....................... 160/370.21 |
| 2006/0260770 | A1 * | 11/2006 | Gradl ....................... 160/370.22 |
| 2008/0035285 | A1 | 2/2008 | Miyachi et al. |
| 2008/0142173 | A1 * | 6/2008 | Hansen .................... 160/370.21 |
| 2008/0223534 | A1 * | 9/2008 | Hansen .................... 160/370.22 |
| 2012/0193044 | A1 * | 8/2012 | Ojima ...................... 160/370.22 |
| 2013/0048228 | A1 * | 2/2013 | Ojima ........................... 160/120 |

FOREIGN PATENT DOCUMENTS

| | | |
|---|---|---|
| EP | 1 619 057 A2 | 1/2006 |
| JP | 2005 145444 | 6/2005 |
| JP | 2006 36190 | 2/2006 |
| JP | 2011 136615 | 7/2011 |

OTHER PUBLICATIONS

International Search Report Issued Apr. 3, 2012 in PCT/JP11/79482 Filed Dec. 20, 2011.

English translation of the International Preliminary Report on Patentability issued Jul. 18, 2013, in PCT/JP2011/079482, filed Dec. 20, 2011.

International Preliminary Report on Patentability issued Jul. 11, 2013, in PCT/JP2011/079482, filed Dec. 20, 2011.

Written Opinion of the International Searching Authority issued Apr. 3, 2012, in PCT/JP2011/079482, filed Dec. 20, 2011 (with English-language translation).

Combined Office Action and Search Report issued Feb. 5, 2015 in Chinese Patent Application No. 201180063506.1 (Japanese translation of the Chinese Search Report and English translation of the Chinese Search Report based on the Japanese translation).

* cited by examiner

F I G. 1
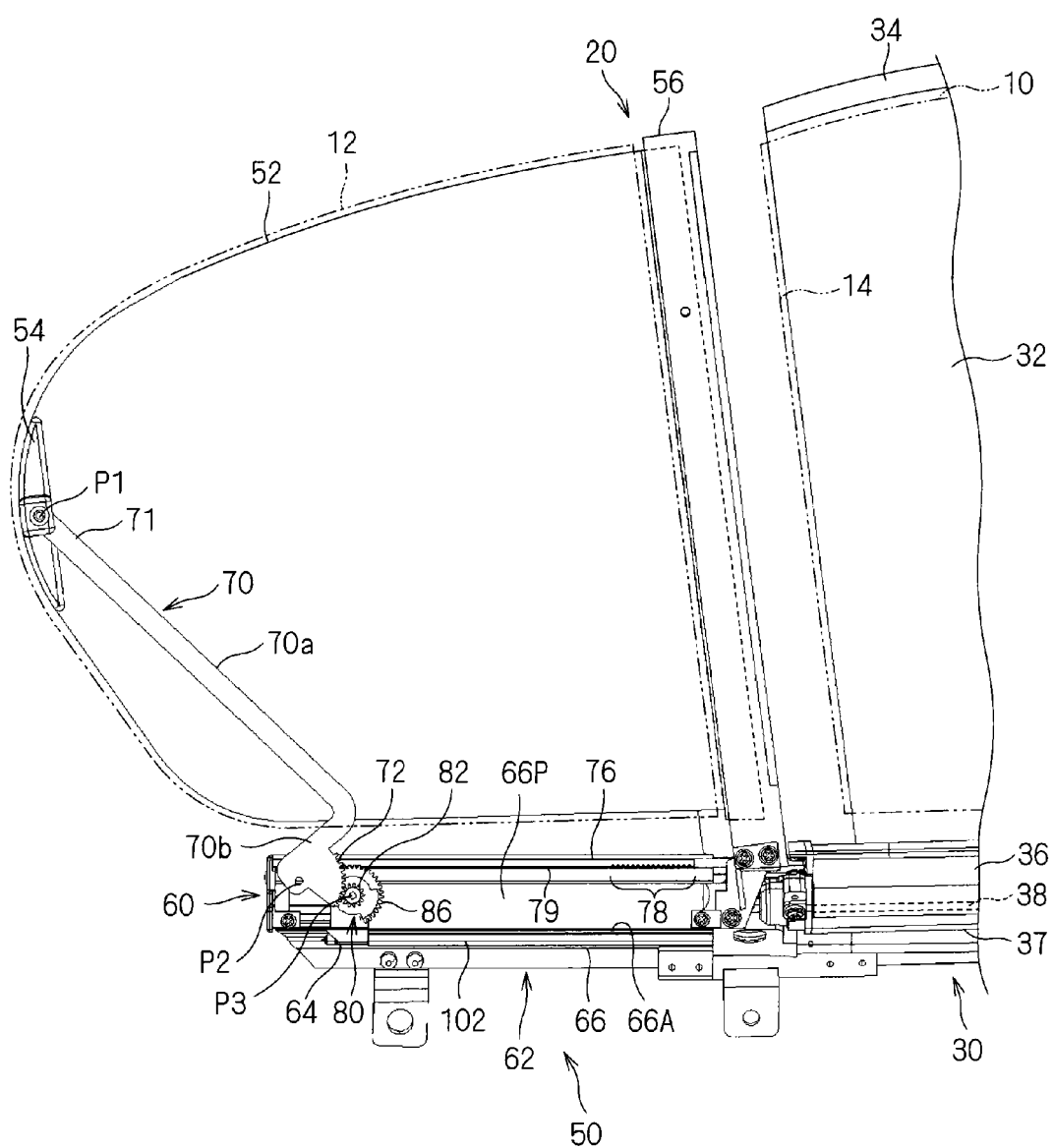

F I G . 4
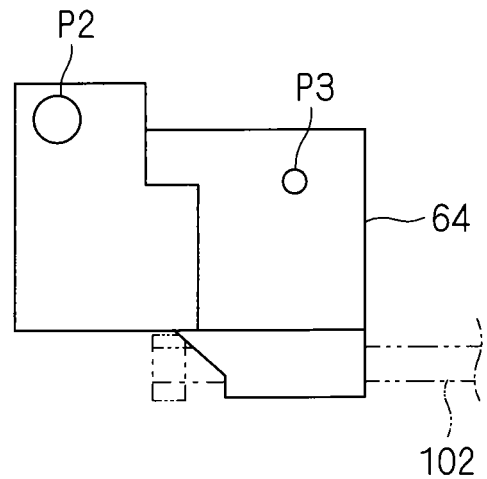

F I G . 5
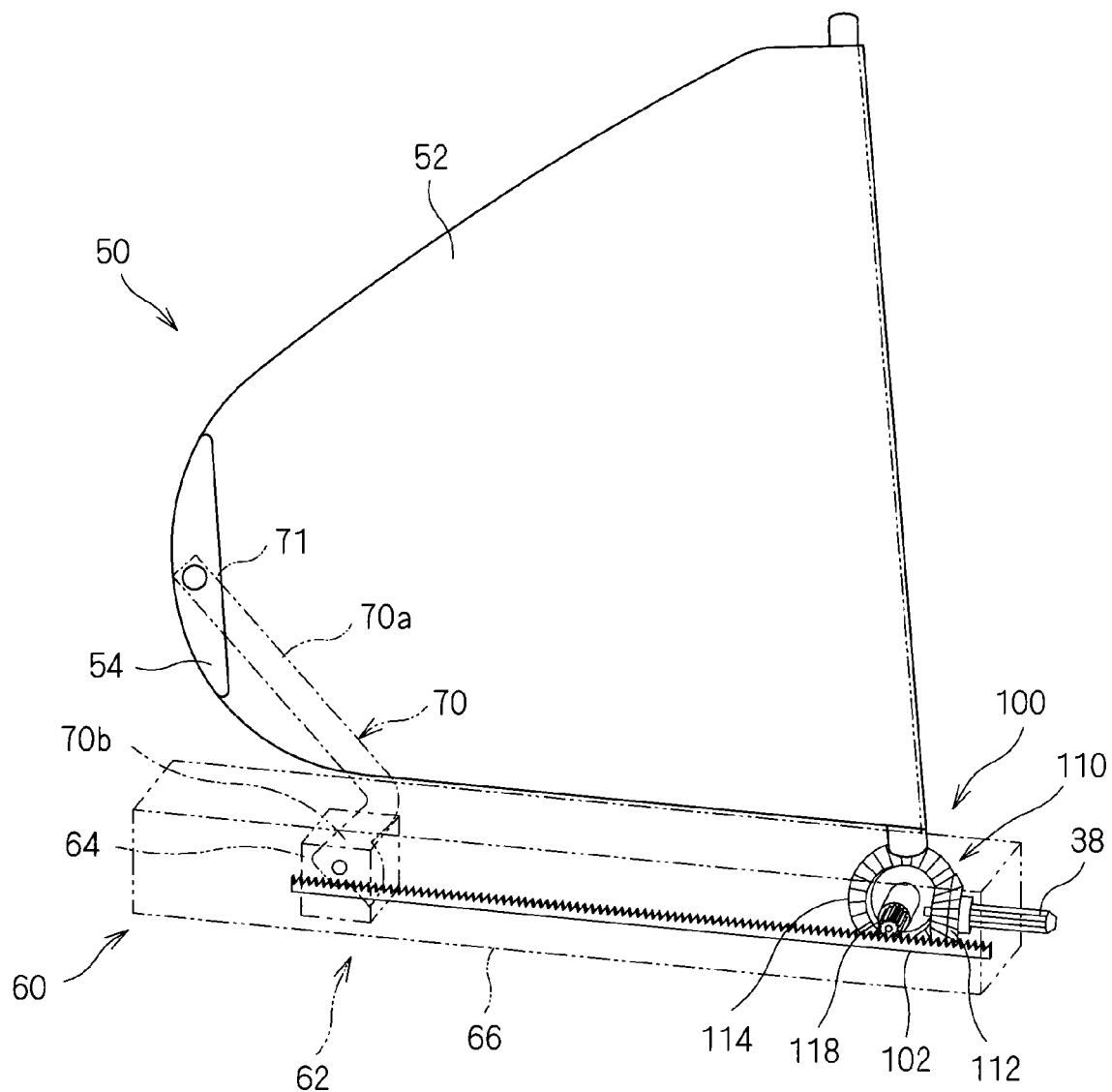

F I G. 1 3
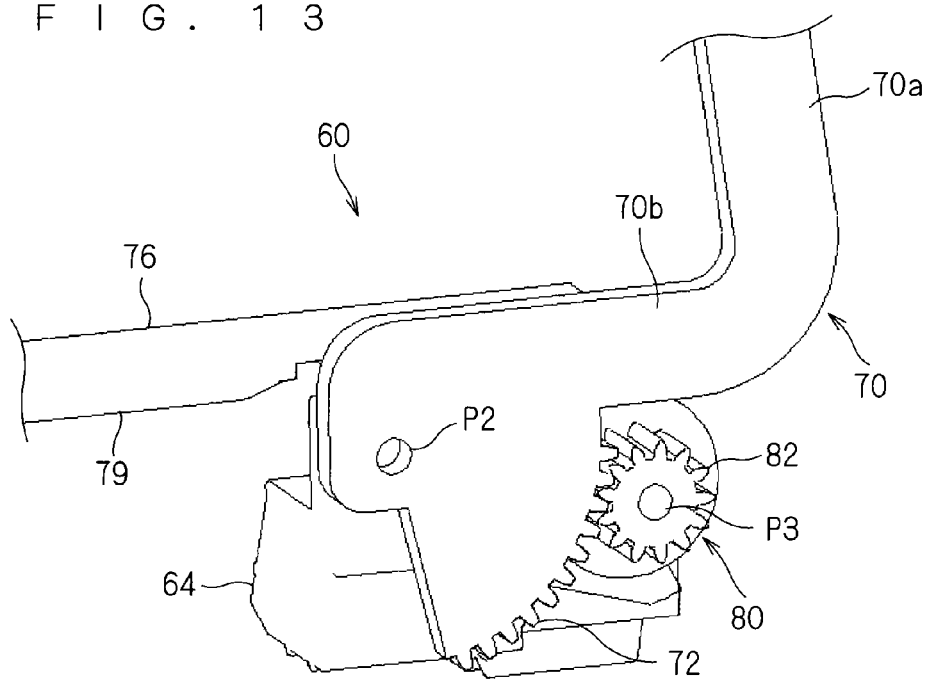
F I G. 1 4
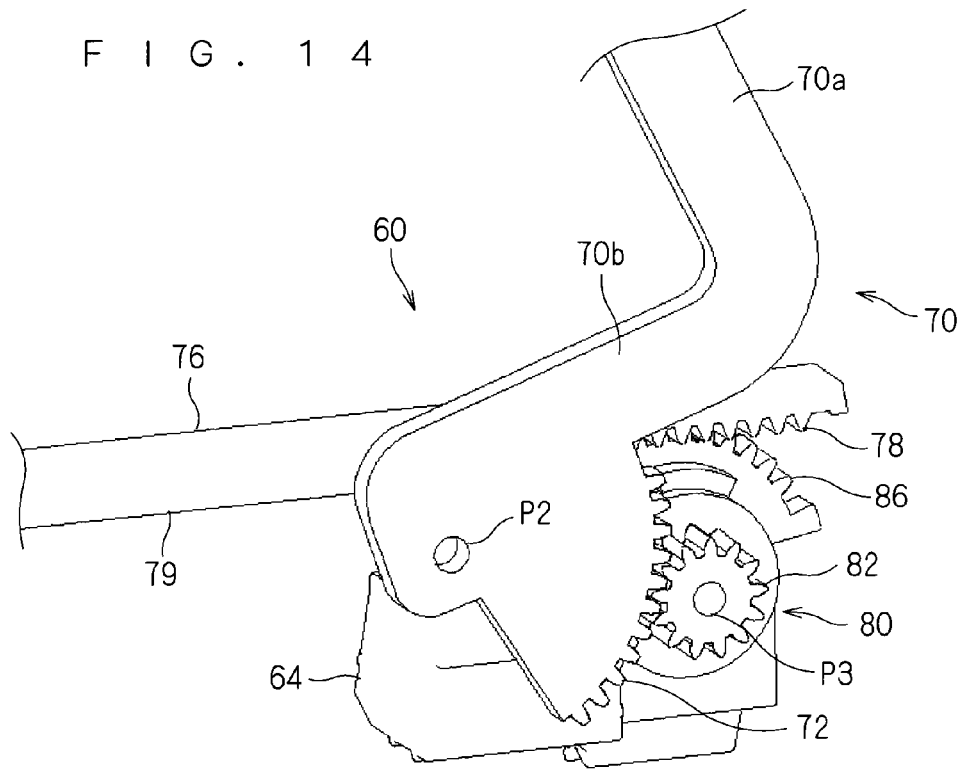

F I G. 2 6
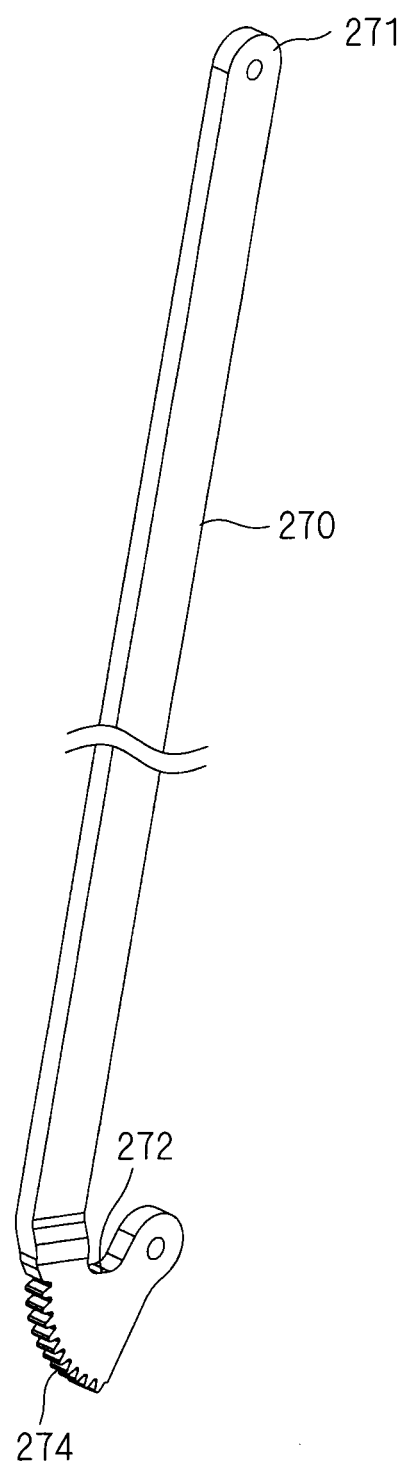

VEHICLE WINDOW SHADE APPARATUS

TECHNICAL FIELD

The present invention relates to a window shade device for vehicles that covers a window of a vehicle to be shielded and opened.

BACKGROUND ART

Conventionally, this type of window shade device has been disclosed in, for example, Patent Document 1.

According to Patent Document 1, a window shade sheet wound up by a winding shaft is drawn by a contour holding member. The contour holding member is rockably coupled with a slide element guided by a guide rail. The contour holding member is pressed by a pressure spring at the end of an extraction path, whereby the window shade is drawn.

PRIOR ART DOCUMENT

Patent Document

Patent Document 1: Japanese Patent Application Laid-Open No. 2005-145444

SUMMARY OF THE INVENTION

Problem to be Solved by the Invention

According to Patent Document 1, unfortunately, if the contour holding member abuts against the pressure spring when the window shade sheet is drawn, a large force is required for moving the slide element.

As a result, the operability in drawing deteriorates when the slide element is manually moved. And, when the slide element is moved by an actuator such as a motor, a heavy burden is imposed on the actuator.

Therefore, the present invention has an object to allow an arm to change its posture with a reduced force in a case where a shade is drawn by causing the arm to change its posture while moving the arm.

Means to Solve the Problem

To solve the above-mentioned problem, a first aspect relates to a window shade device for vehicles that covers a window of a vehicle to be shielded and opened, which includes: a window shade configured to shield the window; a windup device winding up the window shade to be drawn therefrom and housed therein; a guide and support mechanism that includes a guide path member including a guide path along a drawing and housing direction of the window shade and supports a movable member along the guide path; and an arm that includes one end serving as a shade coupling part coupled to a drawing-direction edge portion of the window shade and the other end rotatably supported by the movable member and is configured to change a posture thereof between a first posture in which the shade coupling part is located on the housing direction side of the window shade and a second posture in which the shade coupling part is located on the drawing direction side of the window shade, wherein a first gear is provided to the arm and a second gear is provided to at least a part of the guide path, and the window shade device for vehicles further includes a deceleration gear mechanism that is provided so as to mesh with each of the first gear and the second gear, and decelerates and transfers, upon meshing with the first gear, a rotational movement by meshing with the second gear as a rotational movement for causing the arm to change the posture thereof between the first posture and the second posture.

In a second aspect, in the window shade device for vehicles according to the first aspect, the deceleration gear mechanism is provided to the movable member, constantly meshes with the first gear, and meshes with the second gear upon moving of the movable member through the portion of the guide path in which the second gear is provided.

In a third aspect, in the window shade device for vehicles according to the second aspect, the deceleration gear mechanism includes a first intermediate gear that meshes with the first gear and a second intermediate gear that has a larger radius of curvature than that of the first intermediate gear and meshes with the second gear, the first intermediate gear and the second intermediate gear being integrated with each other so as to be coaxially centered.

In a fourth aspect, in the window shade device for vehicles according to the second or third aspect, the first gear is an arc-shaped gear having the center corresponding to the center of rotation when the arm changes the posture thereof, and the second gear includes rack teeth extending along the guide path.

In a fifth aspect, in the window shade device for vehicles according to any one of the second to fourth aspects, the second gear includes rack teeth provided in a path portion of the guide path, the path portion ranging from an intermediate portion of the guide path to the drawing-direction edge portion of the window shade.

In a sixth aspect, in the window shade device for vehicles according to any one of the second to fourth aspects, the second gear includes rack teeth provided in a portion of the guide path, the portion ranging from the housing-direction edge portion of the window shade to the intermediate portion of the guide path.

In a seventh aspect, in the window shade device for vehicles according to any one of the second to fourth aspects, the second gear includes rack teeth provided in an intermediate portion of the guide path except for both ends thereof.

In an eighth aspect, in the window shade device for vehicles according to the sixth or seventh aspect, a posture keeping mechanism is provided, the posture keeping mechanism keeping the arm in the second posture in the state in which the arm has changed the posture thereof to the second posture.

In a ninth aspect, in the window shade device for vehicles according to the eighth aspect, the posture keeping mechanism includes: a second-gear-side planar part provided in a portion of the guide path on the drawing direction side of the window shade with respect to a portion thereof in which the rack teeth are provided; and a second-intermediate-gear-side abutment portion that is provided adjacent to the second intermediate gear, and keeps the arm in the second posture through contact with the second-gear-side planar part in the state in which the arm has changed the posture thereof to the second posture.

In a tenth aspect, in the window shade device for vehicles according to any one of the sixth to ninth aspects, a groove of the rack teeth on the drawing-direction edge side of the window shade is open by a larger amount than another groove thereof.

In an eleventh aspect, in the window shade device for vehicles according to any one of the first to tenth aspects, the arm is formed into an approximately L-shape.

Further, to solve the above-mentioned problem, a twelfth aspect relates to a window shade device for vehicles that covers a window of a vehicle to be shielded and opened, which includes: a window shade configured to shield the window; a windup device winding up the window shade to be drawn therefrom and housed therein; a guide and support mechanism that includes a guide path member including a guide path along a drawing and housing direction of the window shade and supports a movable member along the guide path; and an arm that includes one end serving as a shade coupling part coupled to a drawing-side edge portion of the window shade and the other end rotatably supported by the movable member and is configured to change a posture thereof between a first posture in which the shade coupling part is located on the housing direction side of the window shade and a second posture in which the shade coupling part is located on the drawing direction side of the window shade, wherein: a first gear is provided to the arm and a second gear is provided to at least a part of the guide path; the window shade device for vehicles further includes deceleration gear mechanism that includes a first intermediate gear member including a first intermediate gear that meshes with the first gear, a second intermediate gear member including a second intermediate gear that meshes with the second gear, and at least one relay deceleration gear member that is provided between the first intermediate gear member and the second intermediate gear member and decelerates the rotational movement on the second intermediate gear member side to transfer the rotational movement to the first intermediate gear member side, parts of the rotational axes thereof being disposed coaxially; and the deceleration gear mechanism decelerates and transfers, via the relay deceleration gear member, the rotational movement of the second intermediate gear member upon meshing of the second gear and the second intermediate gear as the rotational movement for causing the arm to change the posture thereof between the first posture and the second posture upon meshing of the first intermediate gear and the first gear.

In a thirteenth aspect, in the window shade device for vehicles according to the twelfth aspect, the second gear is provided so as to mesh with the second intermediate gear in the entire travel in which the movable member moves through the whole of the guide path, and the deceleration gear mechanism is set to have a degree of deceleration for causing the arm to change the posture thereof from the first posture to the second posture and vice versa upon movement of the movable member through the whole of the guide path.

In a fourteenth aspect, in the window shade device for vehicles according to the twelfth or thirteenth aspect, among the rotational axes of the first intermediate gear member, the second intermediate gear member, and the at least one relay deceleration gear member, ones to be coaxially disposed and the other are disposed at intervals along the guide path.

In a fifteenth aspect, in the window shade device for vehicles according to any one of the twelfth to fourteenth aspects, the first intermediate gear member, the second intermediate gear member, and the at least one relay deceleration gear member are each obtained by integrating a large-diameter gear and a small-diameter gear so as to be coaxially centered, and sequentially mesh with each other so as to decelerate and transfer the rotational movement.

In a sixteenth aspect, in the window shade device for vehicles according to any one of the twelfth to fifteenth aspects, the rotational axis of the first intermediate gear member and the rotational axis of the second intermediate gear member are disposed coaxially.

In a seventeenth aspect, in the window shade device for vehicles according to any one of the twelfth to sixteenth aspects, the rotational axis of the first gear is disposed at a position different from those of the rotational axes of the first intermediate gear member, the second intermediate gear member, and the at least one relay deceleration gear member.

In an eighteenth aspect, in the window shade device for vehicles according to the seventeenth aspect, the rotational axis of the first gear is disposed at a position spaced from the rotational axes of the first intermediate gear member, the second intermediate gear member, and the at least one relay deceleration gear member along the guide path.

In a nineteenth aspect, in the window shade device for vehicles according to any one of the twelfth to sixteenth aspects, the rotational axis of the first gear is disposed coaxially with at least one of the rotational axes of the first intermediate gear member, the second intermediate gear member, and the at least one relay deceleration gear member.

Effects of the Invention

According to the first aspect, the deceleration gear mechanism meshes with the first gear and the second gear to cause the arm to change its posture, whereby it is possible to draw the shade by causing the arm to change its posture while moving the arm. In this case, the deceleration gear mechanism decelerates and transfers the rotational movement through meshing with the second gear as the rotational movement for causing the arm to change its posture between the first posture and the second posture through meshing with the first gear, which enables to cause the arm to change its posture with a reduced force.

According to the second aspect, the deceleration gear mechanism constantly meshes with the first gear, which enables to smoothly transfer a force between the deceleration gear mechanism and the first gear.

According to the third aspect, with a simple configuration, the input of the rotational movement through meshing with the second gear can be output as the rotational movement for causing the arm to change its posture between the first posture and the second posture such that the rpm of the output side is smaller than the rpm of the input side.

According to the fourth aspect, the arm can be caused to change its posture by the rack teeth disposed along the guide path, which enables to make the configuration simple and compact.

According to the fifth aspect, the arm can be caused to change its posture when the movable member moves on the drawing-direction edge side.

According to the sixth aspect, the arm can be caused to change its posture at an early stage of drawing the window shade, which is a stage at which the windup force by the windup device is relatively small. This enables to reduce a maximum force required for drawing the window shade as much as possible.

According to the seventh aspect, the arm can be caused to change its posture when the movable member moves through the intermediate portion of the guide path.

According to the eighth aspect, the state in which the arm has changed its posture to the second posture can be kept.

According to the ninth aspect, the state in which the arm has changed its posture to the second posture can be kept with a simple configuration during the movement of the movable member.

According to the tenth aspect, the deceleration gear mechanism can easily mesh with the second gear when the movable member moves to the housing direction side.

According to the eleventh aspect, the design can be made easily according to, for example, a window shape.

According to the window shade device for vehicles of the twelfth aspect, the first intermediate gear of the deceleration gear mechanism meshes with the first gear, and the second intermediate gear meshes with the second gear, whereby the arm can be caused to change its posture. As a result, the arm is caused to change its posture while moving the arm together with the movable member, which enables to draw the shade. In this case, the deceleration gear mechanism decelerates and transfers the rotational movement of the second intermediate gear member through meshing of the second gear and the second intermediate gear as the rotational movement for causing the arm to change its posture between the first posture and the second posture through meshing of the first intermediate gear and the first gear. Accordingly, the arm can be caused to change its posture with a reduced force.

In particular, the rotational movement of the second intermediate gear member is transferred to the first intermediate gear member via the relay deceleration gear member, which enables to further decelerate and transfer the rotational movement. This causes the arm to change its posture slowly in a longer portion of the guide path.

Moreover, parts of the first intermediate gear member, second intermediate gear member, and at least one relay deceleration gear member are disposed coaxially, which enables to make the deceleration gear mechanism compact.

According to the thirteenth aspect, the movable member moves through the entire guide path, whereby the arm can be caused to gradually change its posture between the first posture and the second posture.

According to the fourteenth aspect, among the rotational axes of the first intermediate gear member, second intermediate gear member, and at least one relay deceleration gear member, ones disposed coaxially and the other are disposed at intervals along the guide path. This enables to reduce the projected area of the deceleration gear mechanism in the guide path direction and prevent the guide and support mechanism from becoming large.

According to the fifteenth aspect, the rotational movement can be decelerated and transferred sequentially by a difference in diameter between the large-diameter gear and the small-diameter gear of each of the first intermediate gear member, second intermediate gear member, and at least one relay deceleration gear member.

According to the sixteenth aspect, the rotational axis of the first intermediate gear member and the rotational axis of the second intermediate gear member are disposed coaxially, which enables to make the deceleration gear mechanism compact.

According to the seventeenth aspect, excellent flexibility in design of the first gear can be provided.

According to the eighteenth aspect, the rotational axis of the first gear is disposed at a position spaced from the rotational axes of the first intermediate gear member, second intermediate gear member, and at least one relay deceleration gear member along the guide path. This enables to reduce the projected areas of the deceleration gear mechanism and the first gear in the guide path direction and prevent the guide and support mechanism and the first gear from becoming large.

According to the nineteenth aspect, the rotational axis of the first gear is disposed coaxially with at least one of the rotational axes of the first intermediate gear member, second intermediate gear member, and at least one relay deceleration gear member. Accordingly, the first gear can also be disposed so as to mesh with the deceleration gear mechanism with a compact configuration.

BRIEF DESCRIPTION OF DRAWINGS

FIG. 1 is a side view showing a window shade device for vehicles in a drawn state according to a first embodiment.

FIG. 4 is a side view showing a movable member.

FIG. 5 is a schematic view showing an associating mechanism.

FIG. 13 is a perspective view showing the operation of the horizontally shielding open/close mechanism when the movable member is moved.

FIG. 14 is a perspective view showing the operation of the horizontally shielding open/close mechanism when the movable member is moved.

FIG. 26 is an explanatory view showing the arm.

EMBODIMENTS FOR CARRYING OUT THE INVENTION

<First Embodiment>

A window shade device for vehicles according to a first embodiment is described below.

<Overall Configuration>

Figure 2:
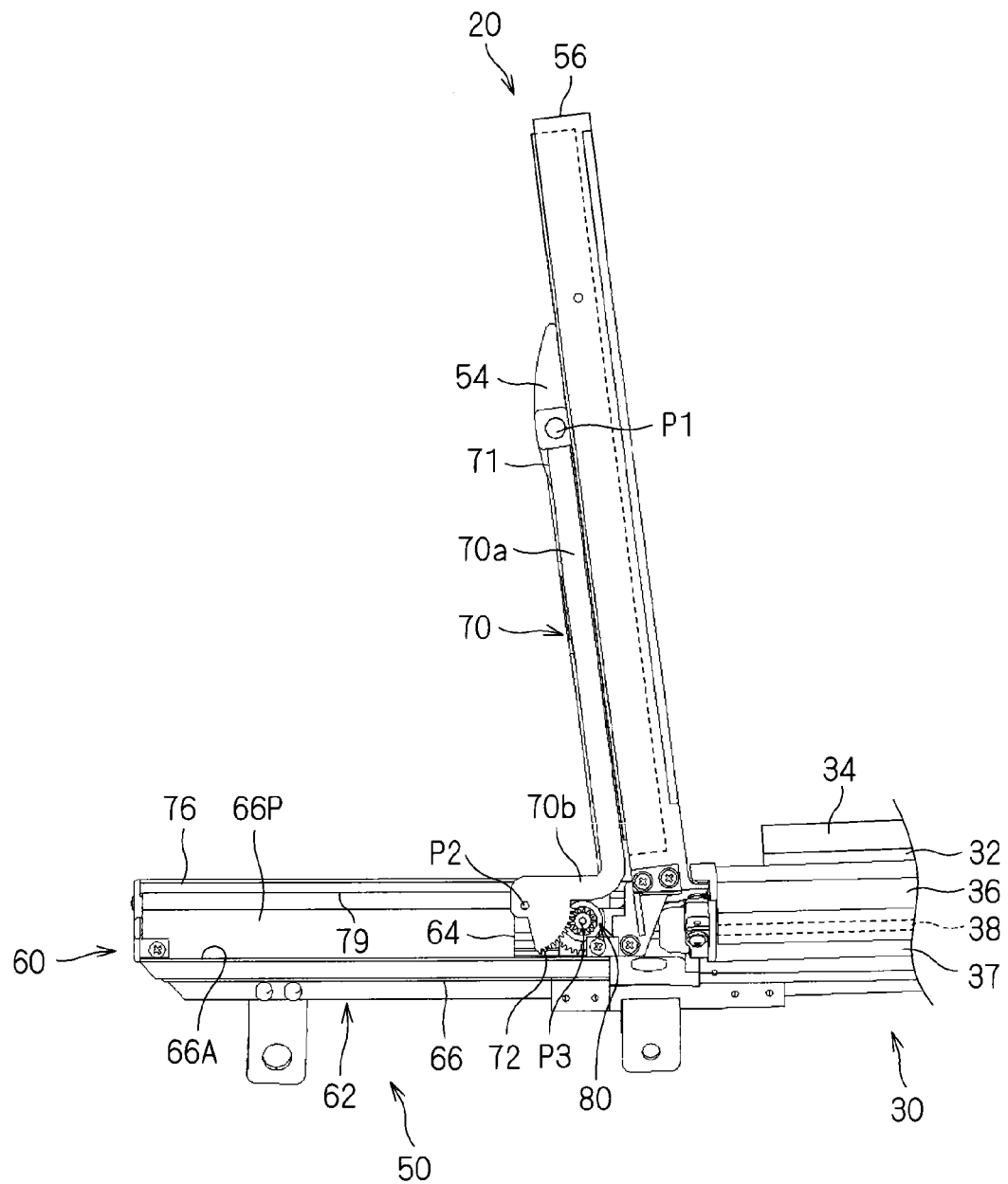
FIG. 2 is a side view showing the window shade device for vehicles in a housed state.
Figure 3:
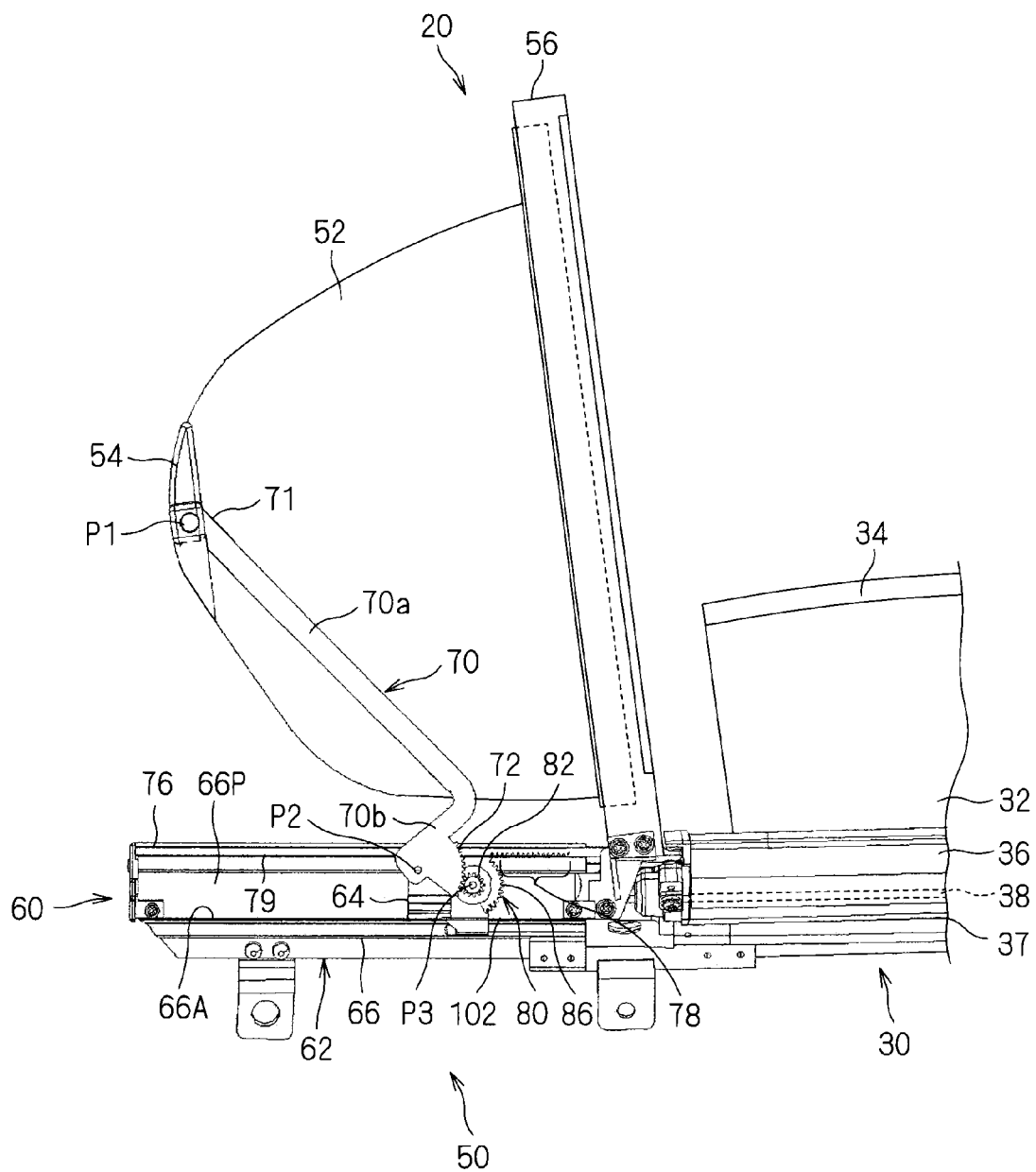
FIG. 3 is a side view showing the window shade device for vehicles in a state between the drawn state and the housed state.

FIG. 1 is a side view showing a window shade device for vehicles 20 in a drawn state, FIG. 2 is a side view showing the window shade device for vehicles 20 in a housed state, and FIG. 3 is a side view showing the window shade device for vehicles 20 in a state between the drawn state and the housed state. Those figures show the state viewed from the outside of a vehicle.

The window shade device for vehicles 20 is incorporated in windows 10 and 12 adjacent to each other in a vehicle, and is configured to cover the windows 10 and 12 to be shielded and opened from the inside of the vehicle. Here, the rear side window 10 (first window, a part of which in the vehicle rear portion is shown in FIGS. 1 to 3) having an approximately square shape is provided in the vehicle, and the rear quarter window 12 (second window) having an approximately triangular shape is provided adjacent to the rear side window 10 in the further vehicle rear portion. Provided between the rear side window 10 and the rear quarter window 12 is a pillar 14.

The window shade device for vehicles 20 includes a vertically shielding window shade device 30 (first window shade device) for covering the rear side window 10, and a horizontally shielding window shade device 50 (second window shade device) for covering the rear quarter window 12. The horizontally shielding window shade device 50 operates for drawing/housing in association with the operation for drawing/housing by the vertically shielding window shade device 30.

<Vertically Shielding Window Shade Mechanism>

The vertically shielding window shade device 30 includes a vertically shielding window shade 32 (first window shade) and a vertically shielding windup device 36 (first windup device).

The vertically shielding window shade 32 is formed of a fabric, resin sheet, or the like into such a shape as to shield the rear side window 10. Here, the vertically shielding window shade 32 is formed in approximately the same size and shape as those of the rear side window 10. Mounted at the distal edge portion of the first window shade 32 is a stay 34 formed of a resin, metal, or the like into an approximately rod shape. The stay 34 can be fixed by, for example, being hooked to the vehicle side portion located above the rear side window 10 in a state in which the vertically shielding window shade 32 is drawn.

The vertically shielding windup device 36 includes a windup shaft member 38 capable of winding up the vertically shielding window shade 32 and is configured to wind up the vertically shielding window shade 32 to be drawn/housed (as to the windup shaft member 38, see FIG. 1).

That is, the vertically shielding windup device 36 is configured such that the windup shaft member 38 capable of winding up the vertically shielding window shade 32 is rotatably supported in a case 37 formed of a resin, metal, or the like. The windup shaft member 38 is biased in the direction in which the vertically shielding window shade 32 is wound up by a windup biasing member (not shown) such as a coil spring. When the stay 34 is pulled, the vertically shielding window shade 32 is drawn from the vertically shielding windup device 36 against the biasing force of the windup biasing member. Meanwhile, when the force of pulling the stay 34 is released, the vertically shielding window shade 32 is wound up by and housed in the vertically shielding windup device 36 by the biasing force exerted on the windup shaft member 38 in the windup direction. The vertically shielding windup device 36 is incorporated in the vehicle along the lower edge of the rear side window 10. The vertically shielding window shade 32 is drawn from below the rear side window 10 in this incorporated state, with the result that the vertically shielding window shade 32 can shield substantially the entire rear side window 10.

<Horizontally Shielding Window Shade Mechanism>

The horizontally shielding window shade device 50 includes a horizontally shielding window shade 52 (second window shade), a horizontally shielding windup device 56 (second windup device), and a horizontally shielding open/close mechanism 60 (shielding open/close mechanism).

The horizontally shielding window shade 52 is formed of a fabric, resin sheet, or the like into such a shape as to shield the rear quarter window 12. Here, the horizontally shielding window shade 52 is formed into an approximately triangular shape obtained by rounding a distal edge portion thereof. Mounted at the distal edge portion of the horizontally shielding window shade 52 is a quarter stay 54 formed of a resin or the like into an approximately rod shape.

The horizontally shielding windup device 56 winds up the horizontally shielding window shade 52 substantially horizontally to be drawn/housed. That is, the horizontally shielding windup device 56 includes a windup shaft capable of winding up the horizontally shielding window shade 52. The windup shaft is biased in the direction in which the horizontally shielding window shade 52 is wound up by a coil spring or the like (not shown). When the quarter stay 54 is pulled, the horizontally shielding window shade 52 is drawn from the horizontally shielding windup device 56 and covers the rear quarter window 12. Meanwhile, when the force of pulling the quarter stay 54 is released, the horizontally shielding window shade 52 is wound up by and housed in the horizontally shielding windup device 56 by the biasing force of the windup shaft in the windup direction. The horizontally shielding windup device 56 is fixed in such a posture as to extend upward, at the vehicle-rear-side end portion that is one end portion of the vertically shielding windup device 36. The horizontally shielding windup device 56 is incorporated in the pillar 14 located on the vehicle front side of the rear quarter window 12 and is disposed along the front-side edge of the rear quarter window 12. Accordingly, the horizontally shielding window shade 52 covers the rear quarter window 12 to be drawn/housed substantially horizontally.

The horizontally shielding open/close mechanism 60 includes a guide and support mechanism 62, an arm 70, and a deceleration gear mechanism 80. The horizontally shielding open/close mechanism 60 is configured to draw and house the horizontally shielding window shade 52 by moving the arm 70 along the guide and support mechanism 62 and changing the posture of the arm 70 while moving the arm 70.

More specifically, the guide and support mechanism 62 includes a movable member 64 and a guide rail 66 (guide path member).

The guide rail 66 is configured so as to support the movable member 64 to move along the drawing/housing direction of the horizontally shielding window shade 52. Here, the guide rail 66 is formed into an approximately tube shape (approximately rectangular tube shape), where an opening 66A extending along the longitudinal direction of the guide rail 66 is formed on one side surface (here, surface facing the vehicle inside). The inner peripheral surface of the guide rail 66 forms a guide path 66P that extends along the drawing/housing direction of the horizontally shielding window shade 52 and is open toward one side through the opening 66A. One end portion of the guide rail 66 is fixed to the vehicle-rear-side end portion that is one end portion of the vertically shielding windup device 36 via, for example, a bracket. Accordingly, the guide rail 66 is fixed in such a posture as to extend substantially horizontally from the vehicle-rear-side end portion of the vertically shielding windup device 36. The guide rail 66 is incorporated in a portion below the rear quarter window 12 in the car body and is disposed along the lower edge of the rear quarter window 12.

FIG. 4 is a side view showing the movable member 64. As shown in FIGS. 1 to 3 and 4, the movable member 64 is a member formed of a resin or the like, and is supported so as to move along the guide path 66P, that is, along the drawing/housing direction of the horizontally shielding window shade 52. A part of the movable member 64 is disposed in the guide path 66P of the guide rail 66 and travels along the guide path 66P, and the remaining part of the movable member 64 is exposed to the outside of the guide rail 66 through the opening 66A. As described below, the movable member 64 supports the arm 70 and the deceleration gear mechanism 80.

Now, description is given of an example of an associating mechanism that moves the movable member 64 in association with the operation for drawing/housing by the vertically shielding window shade device 30.

FIG. 5 is a schematic view showing an associating mechanism 100. That is, the associating mechanism 100 includes an associating rack member 102 and an associating relay mechanism 110.

The associating rack member 102 is disposed so as to move along the longitudinal direction of the guide rail 66 and is coupled to the movable member 64. The associating rack member 102 may be disposed in the guide rail 66 or may be disposed outside the guide rail 66. In FIGS. 1 to 3, the associating rack member 102 is disposed outside the guide rail 66 and is coupled to a portion of the movable member 64 which is exposed to the outside of the guide rail 66. The movable member 64 is configured to move, when the associating rack member 102 moves along the guide rail 66, in the drawing/housing direction along the guide rail 66 in accordance with the moving direction and moving amount of the associating rack member 102.

More specifically, the associating rack member 102 is linearly formed, and a plurality of teeth are formed in a line on one surface thereof. Here, the associating rack member 102 is supported so as to move along the guide rail 66 with the plurality of teeth facing upward. The associating rack member 102 may be formed of a flexible member such as a resin, which is preferably rigid so as not to bend easily when being pushed. The associating rack member 102 is disposed on the proximal end side of the guide rail 66 so as to extend from the guide rail 66. In a case where the movable member 64 moves toward the housing direction side of the horizontally shielding window shade 52, the end portion of the associating rack member 102 is configured to escape toward the outside of the guide rail 66 on the proximal end side. The movable member 64 is fixed to the vehicle-rear-side end portion of the associating rack member 102. The movable member 64 and the associating rack member 102 are fixed to each other by various fixing structures as such as a sandwiching structure and screwing. The associating rack member 102 is moved to advance and retract along the longitudinal direction thereof, so that the movable member 64 reciprocates along the guide path 66P.

The associating relay mechanism 110 includes a first bevel gear 112 and a second bevel gear 114. It suffices that the first bevel gear 112, the second bevel gear 114, and the like are incorporated in, for example, a case-like portion provided between the guide rail 66 and the vertically shielding windup device 36. The rotation of the windup shaft member 38 of the vertically shielding windup device 36 is transferred through meshing of the first bevel gear 112 and the second bevel gear 114 as the force for moving the associating rack member 102 along the guide rail 66.

That is, the first bevel gear 112 is rotatably coupled to the windup shaft member 38 of the vertically shielding windup device 36 in association with the windup shaft member 38. Here, the first bevel gear 112 is directly coupled to the windup shaft member 38 of the first windup device 36 to rotate integrally with the windup shaft member 38. Needless to say, another spur gear, transfer belt, and the like may be provided between the first bevel gear 112 and the windup shaft member 38. That is, it suffices that the first bevel gear 112 rotates in accordance with the rotation timing and rotation direction of the windup shaft member 38.

The second bevel gear 114 is disposed so as to mesh with the first bevel gear 112. That is, the second bevel gear 114 is disposed in a manner that the rotational axis of the first bevel gear 112 and the rotational axis of the second bevel gear 114 intersect each other. Integrated with the second bevel gear 114 is a spur gear 118 that has a rotational axis coinciding with the rotational axis thereof. The spur gear 118 is disposed so as to mesh with the associating rack member 102 in the case-like portion between the guide rail 66 and the vertically shielding windup device 36. When the spur gear 118 rotates upon rotation of the second bevel gear 114, the rotational movement thereof is transferred as the force for linearly moving the associating rack member 102 along the guide rail 66.

The association operation of the associating relay mechanism 110 is described.

That is, when the vertically shielding window shade 32 is drawn, the windup shaft member 38 of the vertically shielding windup device 36 rotates in the drawing direction. The first bevel gear 112 rotates in association with the rotation of the windup shaft member 38, and the second bevel gear 114 meshing with the first bevel gear 112 rotates as well. The spur gear 118 rotates in association with the rotation of the second bevel gear 114, and the associating rack member 102 meshing with the spur gear 118 is delivered toward the guide rail 66 side. Then, the movable member 64 moves toward the drawing direction side along the guide rail 66.

Meanwhile, in a case where the vertically shielding window shade 32 is wound up by the windup force of the windup shaft member 38 of the vertically shielding windup device 36, the rotational force of the windup shaft member 38 is transferred to the associating rack member 102 via the first bevel gear 112, the second bevel gear 114, and the spur gear 118. Accordingly, the associating rack member 102 moves along the guide rail 66 and is delivered toward the vertically shielding windup device 36 side. Then, the movable member 64 moves toward the housing direction side along the guide rail 66.

Note that the configuration in which the movable member 64 is moved along the guide path 66P is not limited to the example above. The configuration may be made such that the movable member 64 is moved by, for example, pulling or feeding a wire or the like by the driving force of the actuator such as a motor. The configuration may be made such that for example, the driving force of the actuator such as a motor or the operating force of a person acts as the force of moving the movable member 64 directly without involving the vertically shielding window shade device 30.

Figure 6:
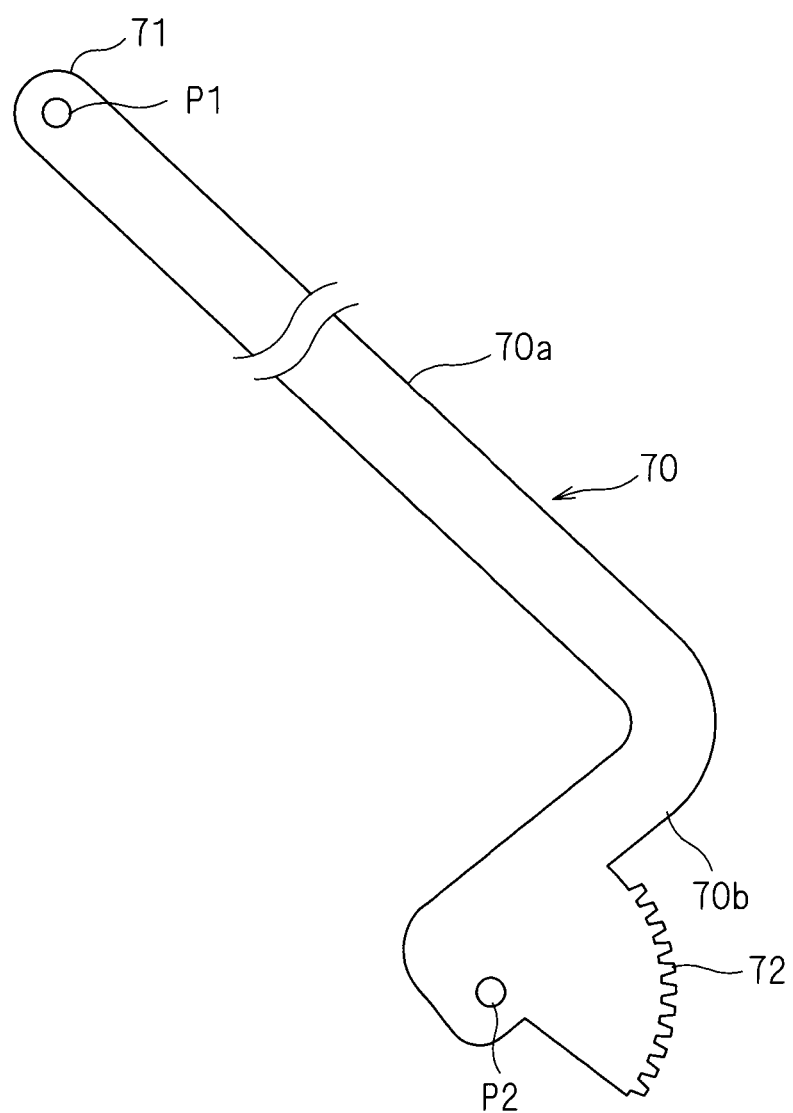
FIG. 6 is a side view showing an arm.

FIG. 6 is a side view showing the arm 70. As shown in FIGS. 1 to 3 and 6, the arm 70 is formed of metal, a resin, or the like into an elongated rod shape, here, an approximately L-shaped rod including a long part 70a and a short part 70b. The end portion of the long part 70a of the arm 70 is a shade coupling part 71 rotatably coupled to the quarter stay 54 of the drawing-side edge portion of the horizontally shielding window shade 52 via a pin P1. The end portion of the short part 70b of the arm 70 is rotatably coupled to the side surface of the outwardly exposed part of the movable member 64 via a pin P2. Accordingly, the arm 70 can change its posture between a first posture (see FIG. 2) in which the shade coupling part 71 is located on the housing direction side of the horizontally shielding window shade 52 and a second posture (see FIG. 1) in which the shade coupling part 71 is located on the drawing direction side of the horizontally shielding window shade 52.

More specifically, in the first posture, the long part 70a of the arm 70 is disposed along the horizontally shielding windup device 56, and the short part 70b thereof is disposed along the guide rail 66. Accordingly, in the state in which the horizontally shielding window shade 52 is housed, the arm 70 is disposed along the horizontally shielding windup device 56 or the guide rail 66 and is less visually conspicuous. The movable member 64 is moved from this state, whereby the horizontally shielding window shade 52 can be drawn.

In the second posture, the shade coupling part 71 is tilted toward the drawing direction side of the horizontally shielding window shade 52 with respect to the first posture. In the moving direction of the movable member 64, the shade coupling part 71 is positioned to be more apart from the movable member 64 toward the drawing direction side in the case of the second posture compared with the case of the first posture. This enables to move the shade coupling part 71 for a distance larger than the moving distance of the movable member 64 such that the horizontally shielding window shade 52 is drawn for a larger amount. The arm 70 is constantly biased toward the first posture side by the biasing force acting on the windup shaft of the horizontally shielding windup device 56.

Provided at the end portion of the short part 70b of the arm 70 is a first gear 72. The first gear 72 is an arc-shaped gear whose center (center of curvature) is the center of rotation when the arm 70 changes its posture, where a plurality of teeth are formed on the outer peripheral surface thereof. Here, the first gear 72 is formed at such a position as to be adjacent to the short part 70b.

Figure 7:
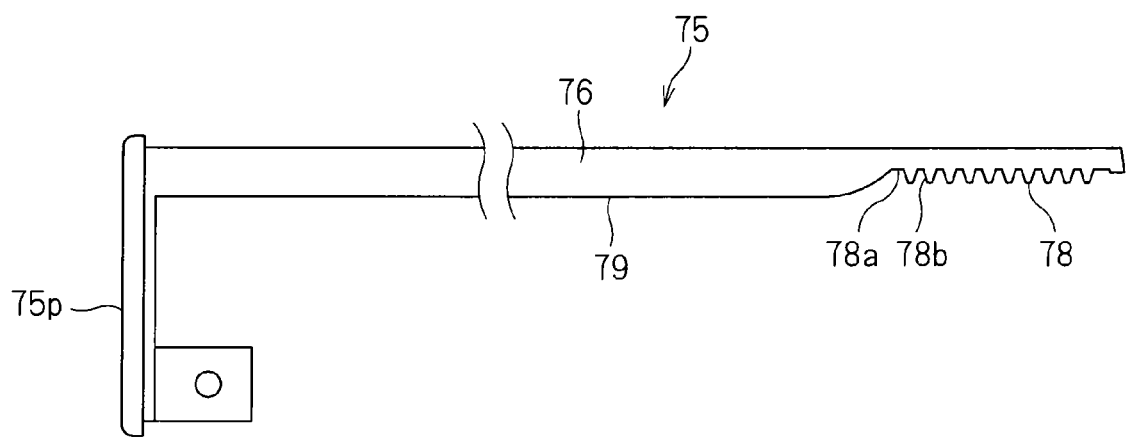
FIG. 7 is a side view showing a gear mounted member including a second gear.

FIG. 7 is a side view showing a gear mounted member 75 including a second gear 78, which is provided to the guide rail 66. As shown in FIGS. 1 to 3 and 7, the gear mounted member 75 includes a long rod-like part 76 and a fixing piece 75p. The long rod-like part 76 is formed into a rod-like member having approximately the same length dimension as that of the guide path 66P and is formed so as to be disposed along the ceiling portion of the guide path 66P in the guide rail 66. The fixing piece 75p that can be fixed to the end portion of the guide rail 66 is provided at one end portion of the long rod-like part 76. The second gear 78 is formed in at least a part of the long rod-like part 76. The second gear 78 is formed through the formation of a plurality of gear teeth in one side portion of the long rod-like part 76 and is used as a kind of rack teeth. The long rod-like part 76 is disposed along the guide path 66P in the state in which the second gear 78 is directed to the inside of the guide path 66P (here, is directed downwardly), so that the rack teeth extending along the guide path 66P are provided in at least a part of the guide path 66P. Here, the second gear 78 is provided to a portion of the long rod-like part 76, which is located at the end portion on the opposite side to the fixing piece 75p. Accordingly, when the long rod-like part 76 is disposed along the guide path 66P, the second gear 78 is disposed as the rack teeth in a portion of the guide path 66P, which ranges from the housing-direction edge portion of the horizontally shielding window shade 52 to the intermediate portion thereof.

A groove 78a of the second gear 78, which is located on the drawing-direction edge side of the horizontally shielding window shade 52, is open by a larger amount than other grooves 78b thereof. This allows the teeth of the second intermediate gear 86 described below to mesh with the second gear 78 smoothly from the drawing-direction edge side of the horizontally shielding window shade 52.

Formed in a portion of the long rod-like part 76, which is located on the side closer to the fixing piece 75p with respect to the portion in which the second gear 78 is provided, is a second-gear-side planar part 79 that is flat along the extending direction of the long rod-like part 76. The long rod-like part 76 is disposed along the guide path 66P, so that the second-gear-side planar part 79 is provided in a portion of the guide path 66P, which is located on the drawing direction side of the horizontally shielding window shade 52 with respect to the portion of the guide path 66P in which the second gear 78 is provided. That is, the second gear 78 is formed in the portion of the guide path 66P, which is the housing-direction-side portion of the horizontally shielding window shade 52, and the second-gear-side planar part 79 is formed in the other portion thereof. The second gear 78 and the second-gear-side planar part 79 are formed to be continuous from each other.

Figure 8:
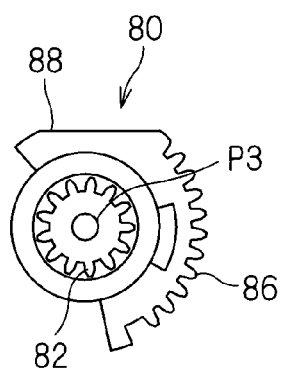
FIG. 8 is a side view showing a deceleration gear mechanism.

FIG. 8 is a side view showing the deceleration gear mechanism 80. As shown in FIGS. 1 to 3 and 8, the deceleration gear mechanism 80 can mesh with each of the first gear 72 and the second gear 78. The deceleration gear mechanism 80 is configured to decelerate and transfer the rotational movement caused by meshing with the second gear 78 as the rotational movement for causing the arm 70 to change its posture between the first posture and the second posture through meshing with the first gear 72. Here, the deceleration and transfer of a force by the deceleration gear mechanism 80 refers to that the length for meshing with the first gear 72 is smaller than the length for meshing with the second gear 78 caused by the movement of the movable member 64 for a predetermined length, in other words, refers to the case in which the moving distance around a pitch circle of the first gear 72 is smaller than a predetermined moving distance of the movable member 64, and accordingly, a small force is converted into a larger force and transferred.

More specifically, the deceleration gear mechanism 80 is a member formed of a resin or the like, and includes a first intermediate gear 82 and a second intermediate gear 86. Here, the first intermediate gear 82 is a gear moving in a circle and is formed so as to mesh with the first gear 72. The second intermediate gear 86 is an arc-shaped gear, and the radius of curvature thereof is larger than that of the first intermediate gear 82. This second intermediate gear 86 is formed so as to mesh with the second gear 78. Then, the first intermediate gear 82 and the second intermediate gear 86 are integrated with each other such that the centers (centers of curvature) thereof are disposed coaxially. At the position adjacent to the pin P2 at which the arm 70 is rotatably supported, the deceleration gear mechanism 80 is rotatably supported on the side surface of the movable member 64 through a pin P3. Note that the side surface on which the movable member 64 supports the deceleration gear mechanism 80 is recessed further relative to the side surface on which the arm 70 is rotatably supported, and is located within the guide path 66P. Accordingly, in the above-mentioned supported state, the second intermediate gear 86 is disposed at such a position as to be opposed to the long rod-like part 76 of the gear mounted member 75 in the guide path 66P, and is configured to mesh with the second gear 78 when moving through the portion in which the second gear 78 is provided as the movable member 64 moves. The first intermediate gear 82 is exposed to the outside of the guide path 66P through the opening 66A to constantly mesh with the first gear 72 of the arm 70.

Further, a second-intermediate-gear-side abutment part 88 is provided to the arc-shaped second intermediate gear 86 to be circumferentially adjacent thereto. The second-intermediate-gear-side abutment part 88 is configured to, in the state in which the arm 70 has changed its posture to the second posture, come into contact with the second-gear-side planar part 79 and keep the arm 70 in the second posture. More specifically, the second-intermediate-gear-side abutment part 88 is formed in a planar shape continuous from the end portion on the rotational direction side of the second intermediate gear 86, which is caused by the movement of the movable member 64 toward the drawing direction side, of the both ends of the second intermediate gear 86. Then, the second gear 78 and the second intermediate gear 86 are released from the meshing when the movable member 64 moves toward the drawing direction of the horizontally shielding window shade 52 along the guide path 66P, whereby the second-intermediate-gear-side abutment part 88 comes into contact with the second-gear-side planar part 79 and the rotational positions of the second intermediate gear 86 and the first intermediate gear 82 are kept in constant states. In addition, the arm 70 including the first gear 72 meshing with the first intermediate gear 82 can be kept in the second posture when the first intermediate gear 82 is kept at a constant rotational position. As described above, the second-gear-side planar part 79 and the second-intermediate-gear-side abutment part 88 constitute a posture keeping mechanism for keeping the arm 70 in the second posture.

Although the second-intermediate-gear-side abutment part 88 is not necessarily required to be planar, if it is planar, the second-intermediate-gear-side abutment part 88 and the second-gear-side planar part 79 can be caused to slide more smoothly.

The operation of the horizontally shielding open/close mechanism 60 of the horizontally shielding window shade device 50 is described. FIGS. 9 to 12 are each a side view showing the operation of the horizontally shielding open/close mechanism 60 when the movable member 64 is moved from the housing side to the drawing side of the horizontally shielding window shade 52, and FIGS. 13 to 16 are each a perspective view showing this operation.

Figure 9:
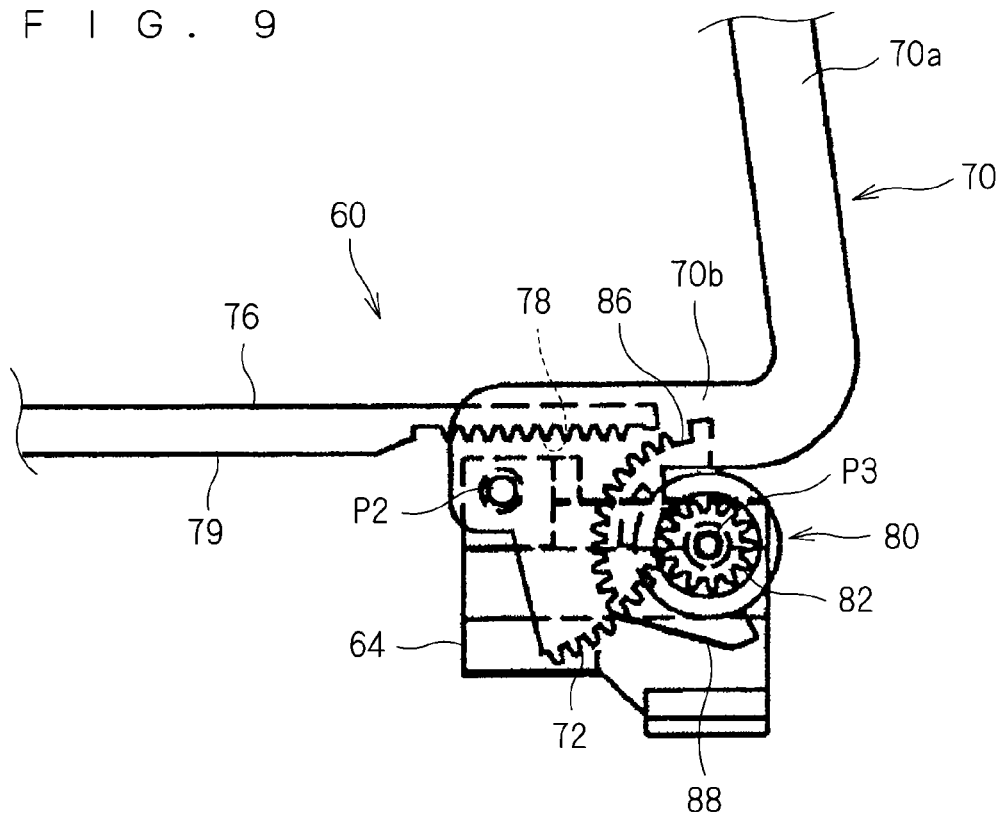
FIG. 9 is a side view showing an operation of a horizontally shielding open/close mechanism when the movable member is moved.

First, in the state in which the movable member 64 is located at the housing-direction-side edge portion of the horizontally shielding window shade 52 in the guide path 66P, that is, in the state in which the long part 70a of the arm 70 is disposed along the horizontally shielding windup device 56 (that is, first posture), as shown in FIGS. 9 and 13, the second intermediate gear 86 is located on the housing direction side of the horizontally shielding window shade 52 with respect to the second gear 78 and does not mesh with the second intermediate gear 86 and the second gear 78. In this state, the second intermediate gear 86 and the second gear 78 may mesh with each other slightly. The first intermediate gear 82 and the first gear 72 constantly mesh with each other, in addition to this state.

Figure 10:
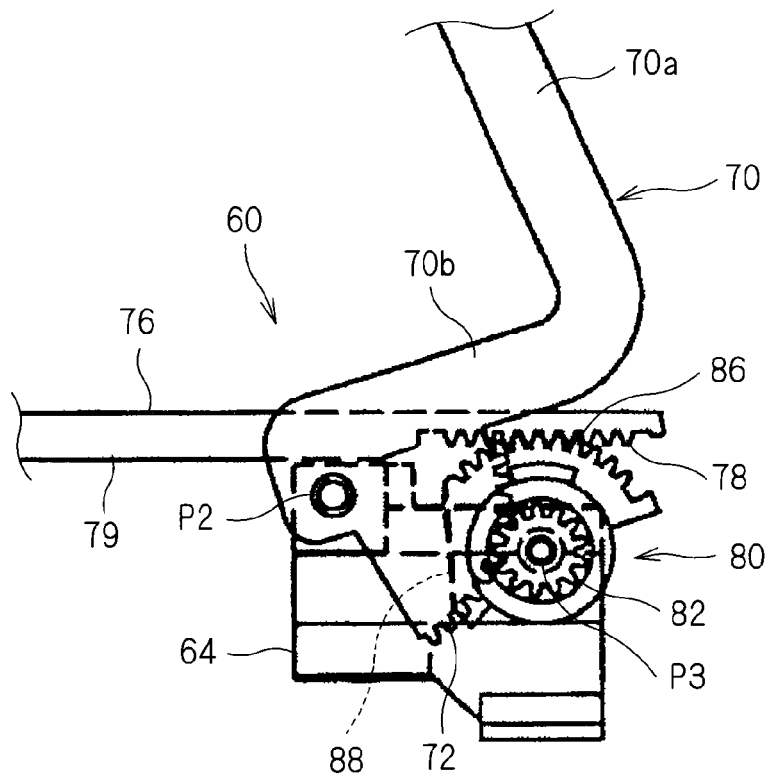
FIG. 10 is a side view showing the operation of the horizontally shielding open/close mechanism when the movable member is moved.

The movable member 64 moves from this state toward the drawing direction side of the horizontally shielding window shade 52 along the guide path 66P by the force through the associating mechanism 100 and the like, whereby the second intermediate gear 86 meshes with the second gear 78 as shown in FIGS. 10 and 14. Accordingly, the first intermediate gear 82 and the second intermediate gear 86 rotate (rotate clockwise in FIGS. 10, 13, and the like). Then, the first gear 72 meshing with the first intermediate gear 82 also rotates, so that the arm 70 changes its posture from the first posture to the second posture as well.

Figure 11:
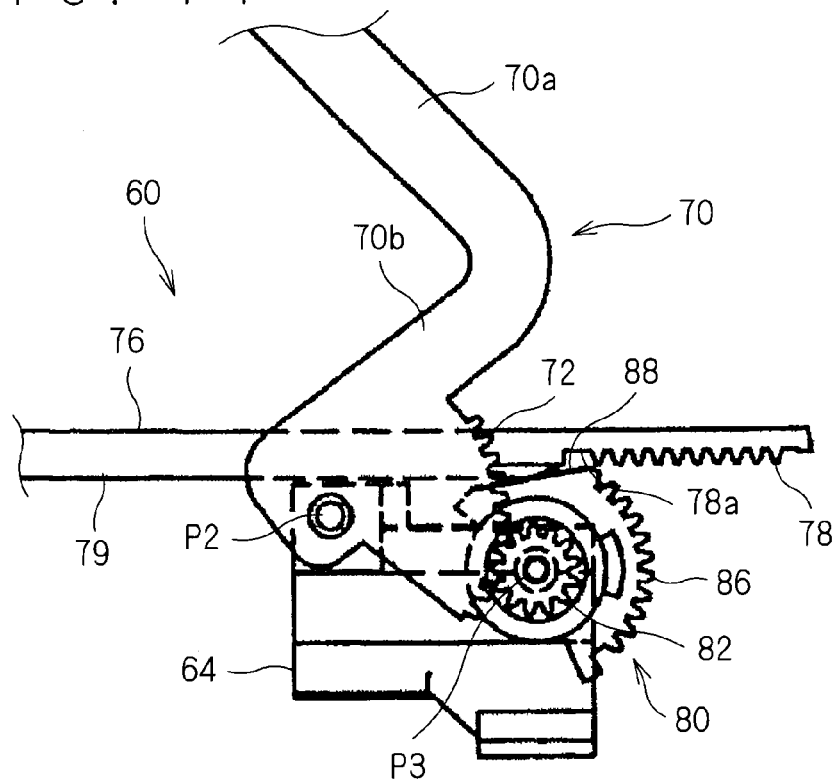
FIG. 11 is a side view showing the operation of the horizontally shielding open/close mechanism when the movable member is moved.
Figure 15:
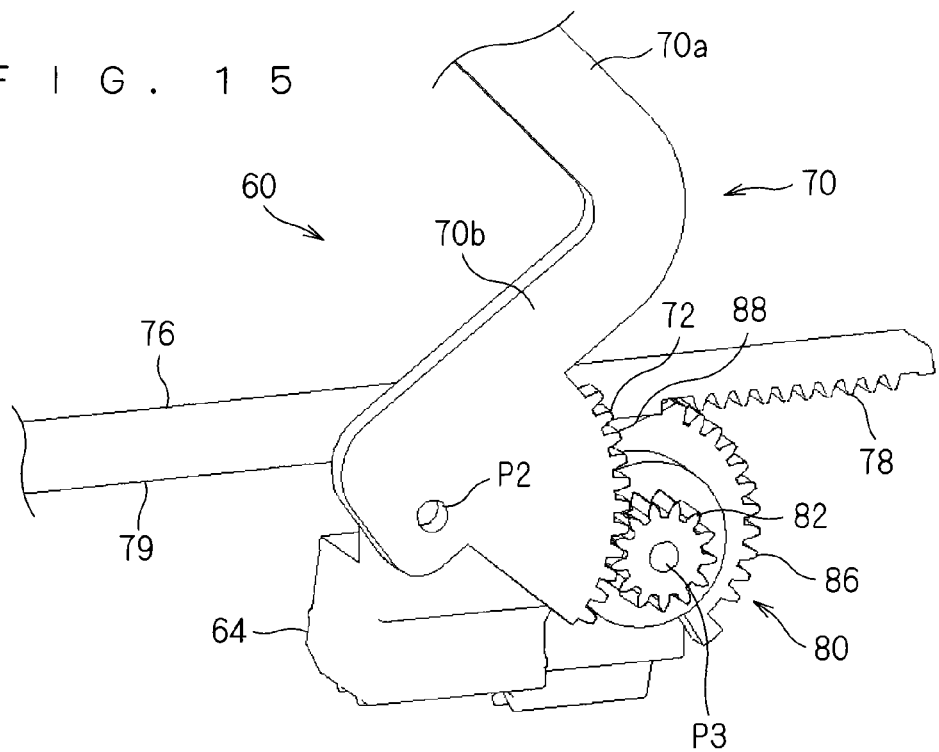
FIG. 15 is a perspective view showing the operation of the horizontally shielding open/close mechanism when the movable member is moved.

The movable member 64 further moves toward the drawing direction side of the horizontally shielding window shade 52 along the guide path 66P, and then, the second intermediate gear 86 reaches the drawing-direction-side edge portion of the horizontally shielding window shade 52 in the second gear 78 as shown in FIGS. 11 and 15, whereby the second intermediate gear 86 and the second gear 78 are gradually released from meshing. At the same time, the second-intermediate-gear-side abutment part 88 adjacent to the second intermediate gear 86 faces upward to be opposed to the second-gear-side planar part 79.

Figure 12:
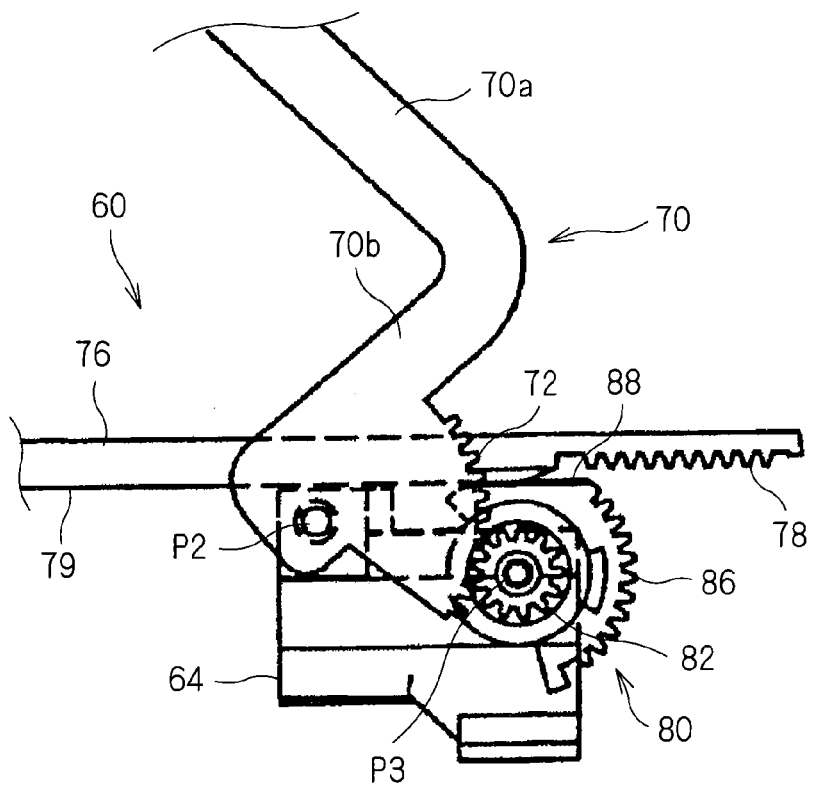
FIG. 12 is a side view showing the operation of the horizontally shielding open/close mechanism when the movable member is moved.
Figure 16:
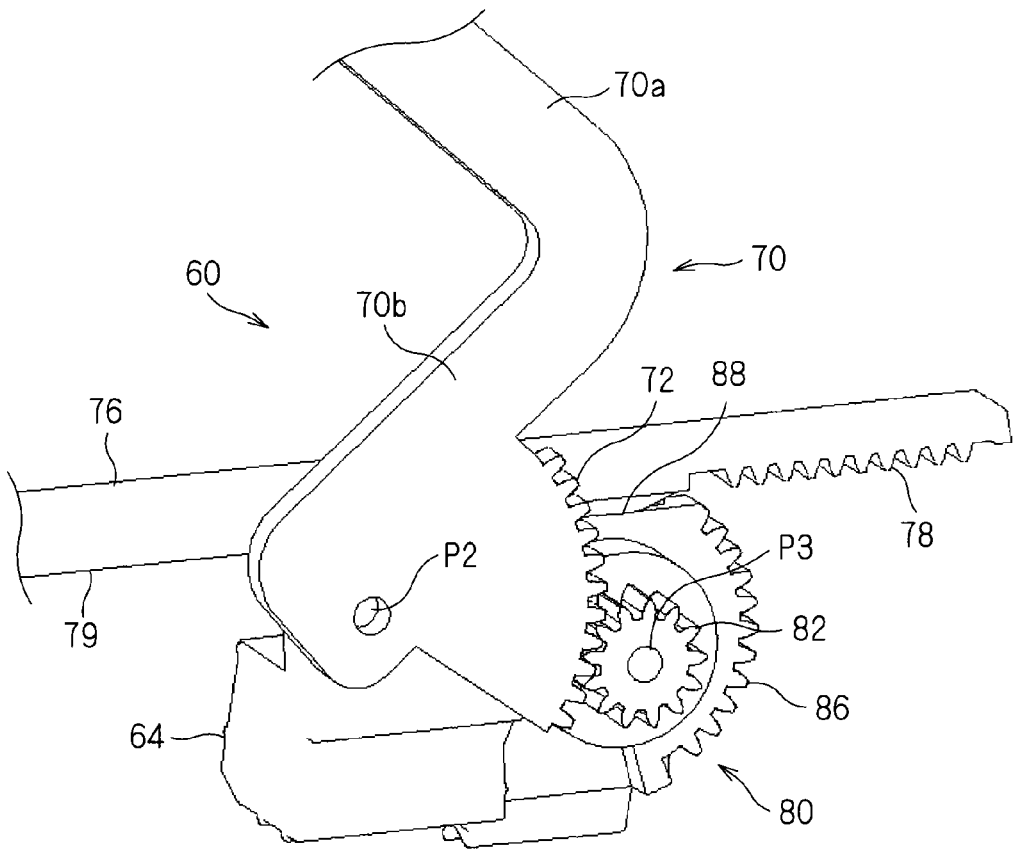
FIG. 16 is a perspective view showing the operation of the horizontally shielding open/close mechanism when the movable member is moved.

Then, the movable member 64 further moves and, as shown in FIGS. 12 and 16, and then, the second intermediate gear 86 and the first intermediate gear 82 rotate until the second intermediate gear 86 and the second gear 78 are completely released from the meshing, whereby the arm 70 changes its posture to the second posture. In this state, the second-intermediate-gear-side abutment part 88 and the second-gear-side planar part 79 face each other and come into contact with each other in a substantially parallel manner. Then, the second-intermediate-gear-side abutment part 88 and the second-gear-side planar part 79 come into contact with each other, whereby the second intermediate gear 86 and the first intermediate gear 82 are prevented from rotating. Accordingly, the arm 70 is kept in the second posture.

After that, in the state in which the second-intermediate-gear-side abutment part 88 and the second-gear-side planar part 79 remain in contact with each other, that is, in the state in which the arm 70 is kept in the second posture, the movable member 64 moves toward the drawing direction side of the horizontally shielding window shade 52 along the guide path 66P.

Then, at the time when the movable member 64 reaches the drawing-direction-side edge portion of the horizontally shielding window shade 52 of the guide path 66P, the horizontally shielding window shade 52 is drawn to cover the rear quarter window 12 almost entirely. Also in this state, the second-intermediate-gear-side abutment part 88 and the second-gear-side planar part 79 are in contact with each other, whereby the arm 70 is kept in the second posture.

The operation of the horizontally shielding open/close mechanism 60 when the movable member 64 is moved from the drawing side to the housing side of the horizontally shielding window shade 52 is opposite to the above.

That is, the movable member 64 is moved toward the housing direction side of the horizontally shielding window shade 52 along the guide path 66P. Then, the movable member 64 reaches the end portion of the second gear 78, so that the second intermediate gear 86 starts meshing with the second gear 78 as the arm 70 is biased toward the second posture side by the windup force of the horizontally shielding windup device 56. In this case, the groove 78a of the second gear 78, which is located on the drawing-direction edge side of the horizontally shielding window shade 52, is opened more compared with the other grooves 78b. Therefore, the teeth of the second intermediate gear 86 are prevented from coming into contact with the teeth of the second gear 78 and can smoothly mesh with the teeth of the second gear 78.

Then, the movable member 64 further moves toward the housing direction side of the horizontally shielding window shade 52, whereby the second intermediate gear 86 and the first intermediate gear 82 rotate through meshing of the second gear 78 and the second intermediate gear 86. Then, the arm 70 changes its posture from the second posture to the first posture through meshing of the first intermediate gear 82 and the first gear 72. The movable member 64 reaches the housing-direction-side edge portion of the horizontally shielding window shade 52 in the guide path 66P, and then, the arm 70 changes its posture to the first posture. In addition, meshing of the second intermediate gear 86 and the second gear 78 is released. In this state, the distal end portion of the arm 70 is biased toward the housing direction side of the horizontally shielding window shade 52 by the windup force of the horizontally shielding windup device 56. Owing to this biasing force, the arm 70 is kept on the first posture side more stably.

According to the horizontally shielding window shade device 50 for vehicles configured as described above, the arm 70 is caused to change its posture through meshing of the deceleration gear mechanism 80 with the first gear 72 and the second gear 78. This enables to cause the arm 70 to change its posture while moving the arm 70, so that the horizontally shielding window shade 52 can be drawn. In this case, the deceleration gear mechanism 80 decelerates and transfers the rotational movement through meshing with the second gear 78 as the rotational movement in which the arm 70 is caused to change its posture between the first posture and the second posture through meshing with the first gear 72. This enables to cause the arm 70 to change its posture with a smaller force.

The deceleration gear mechanism 80 is provided in the movable member 64 to cause the first gear 72 on the arm 70 side and the first intermediate gear 82 to constantly mesh with each other, which enables to smoothly transfer a force between the first gear 72 and the first intermediate gear 82.

Used as the deceleration gear mechanism 80 includes the first intermediate gear 82, which meshes with the first gear 72, and the second intermediate gear 86, which has a larger radius of curvature than that of the first intermediate gear 82 and meshes with the second gear 78, and is configured such that the first intermediate gear 82 and the second intermediate gear 86 are integrated with each other so as to be coaxially centered. This enables the configuration to be relatively simple.

Needless to say, the deceleration gear mechanism is not necessarily required to have the above-mentioned configuration, and may be configured to decelerate the rotational movement through the combination of a larger number of intermediate gears and the like and transfer the rotational movement.

The first gear 72 is an arc-shaped gear whose center is the center of rotation when the arm 70 changes its posture, and the second gear 78 includes rack teeth extending along the guide path 66P. This enables to make the configuration simple and compact.

The second gear 78 includes the rack teeth provided in the portion of the guide path 66P, which extends from the housing direction edge of the horizontally shielding window shade 52 to the intermediate portion of the guide path 66P, and thus, a maximum force required for drawing the horizontally shielding window shade 52 can be made as small as possible. This makes the operating force when the horizontally shielding window shade 52 is drawn as uniform as possible. Therefore, the operability in the case where the horizontally shielding window shade 52 is drawn manually can be improved, or a burden in a case where the horizontally shielding window shade 52 is drawn by an actuator such as a motor can be relieved.

That is, the horizontally shielding windup device 56 is configured to be biased toward the windup direction by the elastic restoring force of a coil spring or the like, and accordingly, the elastic deforming force of the coil spring or the like increases and the windup biasing force thereof increases as the horizontally shielding window shade 52 is drawn. Accordingly, the force required for drawing against the windup biasing force is relatively small at the initial stage of drawing the horizontally shielding window shade 52, and a larger force is required against the windup biasing force as the horizontally shielding window shade 52 is drawn. Therefore, the maximum force required for drawing the horizontally shielding window shade 52 can be made as small as possible by causing the arm 70 to change its posture at the initial stage of drawing when the force required for drawing against the windup biasing force is relatively small.

The posture keeping mechanism is composed of the second-gear-side planar part 79 in the guide path 66P, which is provided in the portion on the drawing direction side of the horizontally shielding window shade 52 with respect to the portion in which the second gear 78 is provided, and the second-intermediate-gear-side abutment part 88, which is provided adjacent to the second gear 78 and keeps the arm 70 in the second posture upon coming into contact with the second-gear-side planar part 79 in the state in which the arm 70 has changed its posture to the second posture. Accordingly, it is possible to keep, with a simple configuration, the state in which the arm 70 keeps the second posture while the movable member 64 is moving after the arm 70 has changed its posture to the second posture.

Of the second gear 78, the groove 78a on the drawing-direction edge side of the horizontally shielding window shade 52 is made open more compared with the other grooves 78b, whereby it is possible to cause the second intermediate gear 86 to mesh with the second gear 78 easily when the movable member 64 moves toward the housing direction side of the horizontally shielding window shade 52.

The arm 70 is formed into an L-shape, which simplifies the design according to a window shape. Needless to say, the arm 70 is not required to have an L-shape and may have, for example, a shape to be curved into a linear or arc shape.

{Modifications}

The portion in the guide path 66P, in which the second gear 78, is formed is not limited to that of the embodiment described above.

Figure 17:
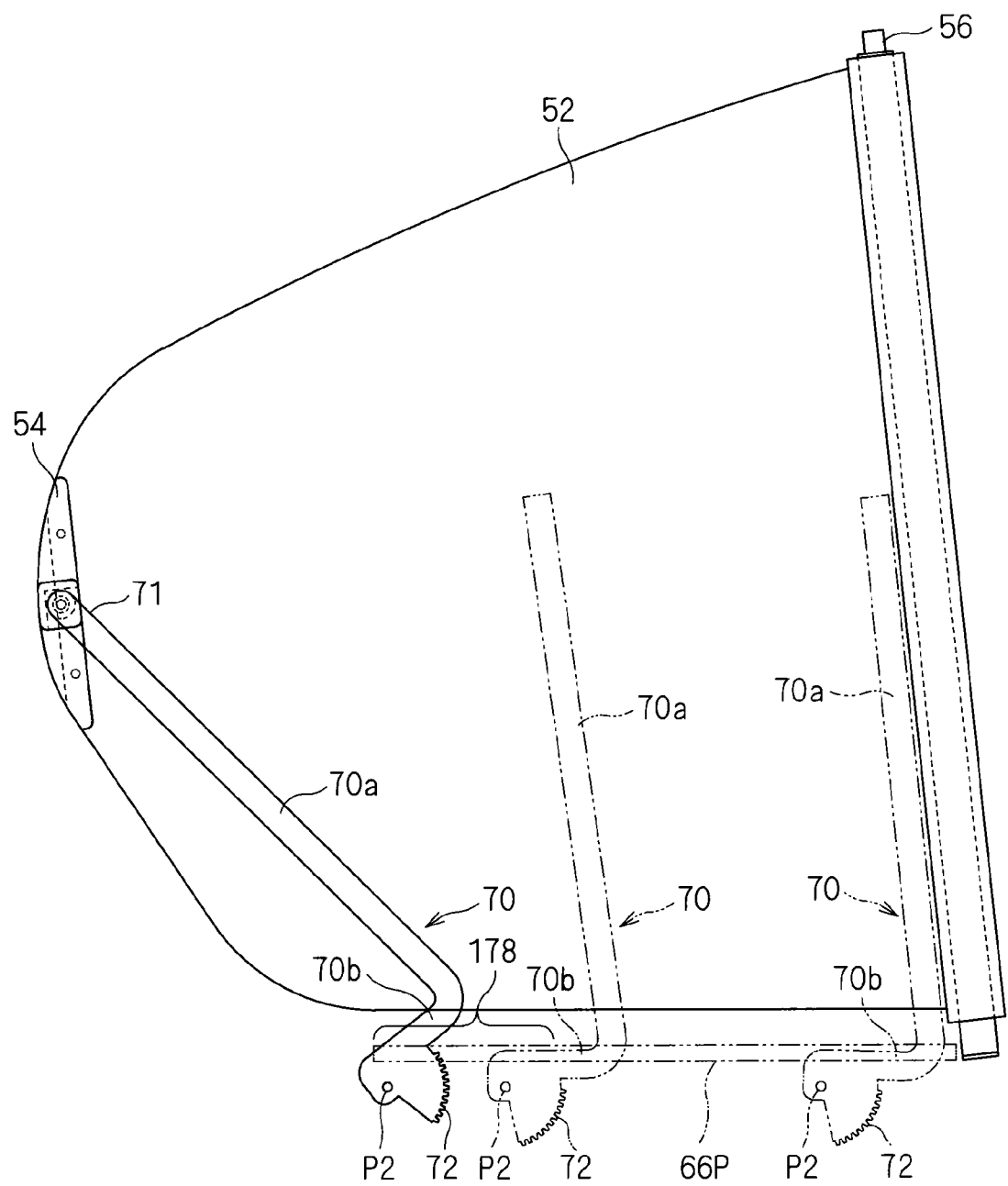
FIG. 17 is an explanatory view showing a modification related to the formation portion for the second gear.
Figure 18:
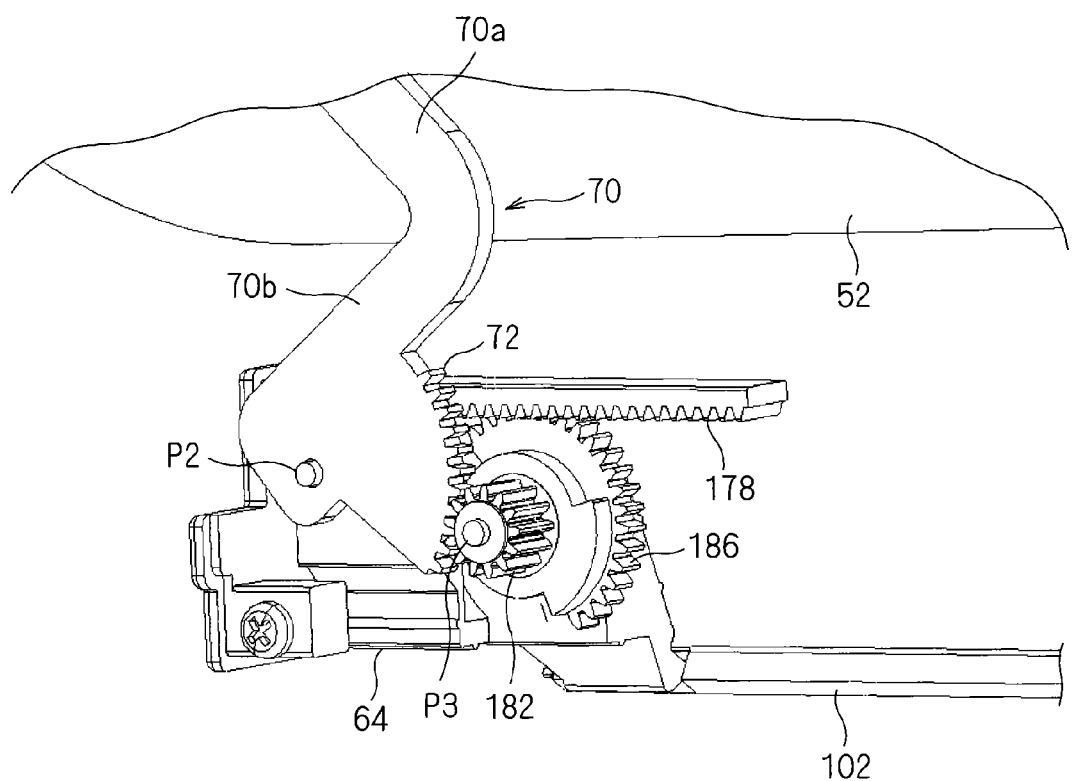
FIG. 18 is an explanatory view showing a state in which a movable member reaches an end in the modification.

As shown in FIG. 17, a second gear 178 equivalent to the second gear 78 may be provided in the path portion of the guide path 66P, which ranges from the intermediate portion of the guide path 66P to the drawing direction edge of the horizontally shielding window shade 52. In this case, in the guide path 66P, the arm 70 moves while keeping the first posture from the housing-direction-side edge of the horizontally shielding window shade 52 to the intermediate portion of the guide path 66P. It suffices that the arm 70 is kept in the first posture in this state by, for example, causing the arm 70 to abut against a regulation member provided in a movable member and keeping the abutment state by the windup biasing force of the horizontally shielding windup device 56. Then, while moving from the intermediate portion of the guide path 66P to the drawing-direction-side edge of the horizontally shielding window shade 52, the arm 70 changes its posture from the first posture to the second posture through meshing of the second gear 178 and the deceleration gear mechanism as in the embodiment described above. In the state in which the arm 70 finally has reached the drawing-direction-side edge of the horizontally shielding window shade 52 in the guide path 66P and stopped, as shown in FIG. 18, the first gear 72 and a first intermediate gear 182 equivalent to the first intermediate gear 82 mesh with each other, and the second gear 178 equivalent to the second gear 78 meshes with a second intermediate gear 186 equivalent to the second intermediate gear 86. Accordingly, the state in which the arm 70 has changed its posture to the second posture is kept.

Figure 19:
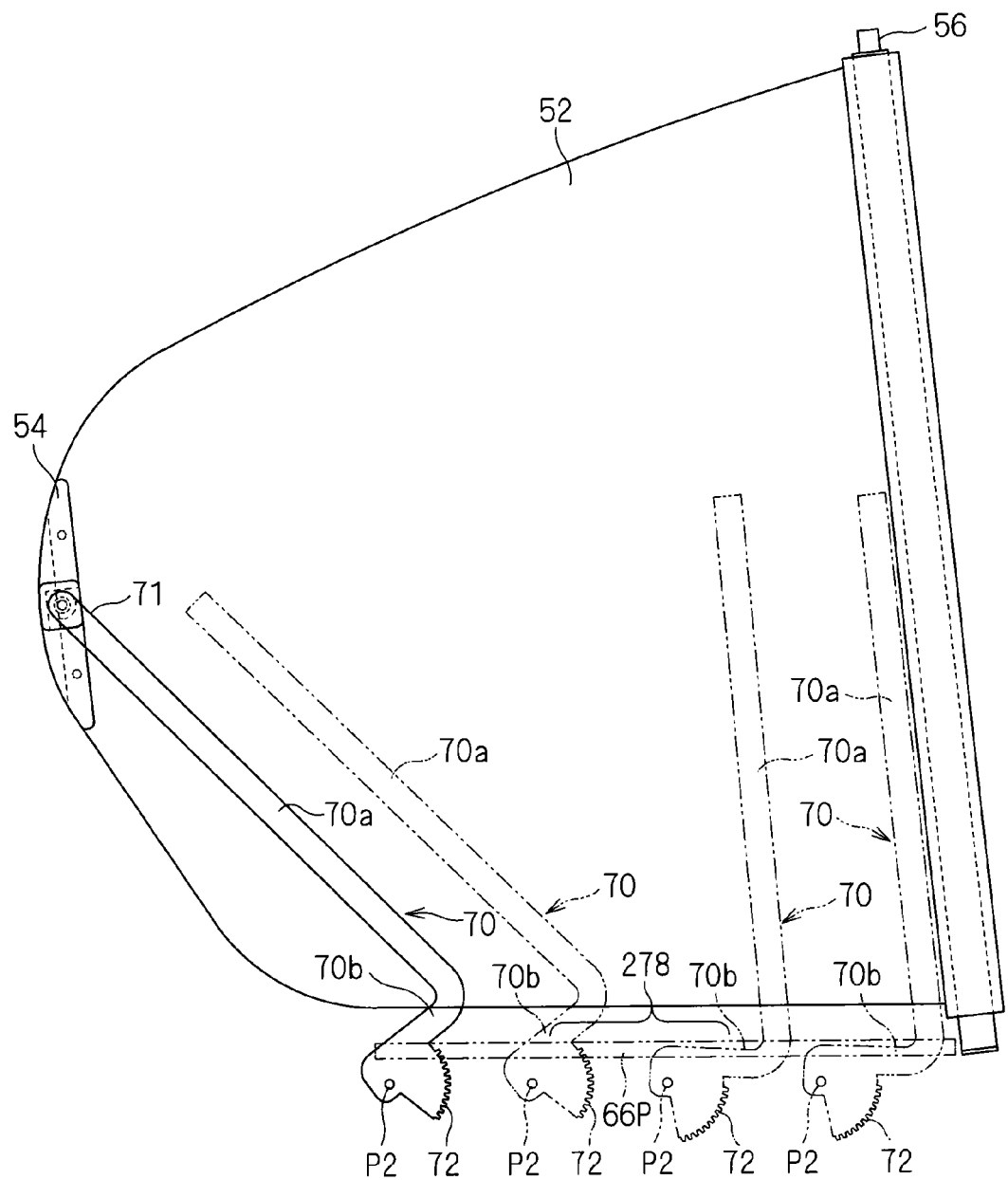
FIG. 19 is an explanatory view showing another modification related to the formation portion for the second gear.

As shown in FIG. 19, a second gear 278 equivalent to the second gear 78 may be provided in an intermediate portion of the guide path 66P except for the both ends thereof. In this case, in the guide path 66P, the arm 70 moves while keeping the first posture from the housing-direction-side edge of the horizontally shielding window shade 52 to the intermediate portion of the guide path 66P. The arm 70 may be kept in the first posture in this state as in the modification described above. Then, the arm 70 changes its posture from the first posture to the second posture through meshing of the second gear 178 and the deceleration gear mechanism while moving from one intermediate portion to another intermediate portion of the guide path 66P, as in the embodiment above. Then, the arm 70 moves to the drawing-direction-side edge of the horizontally shielding window shade 52 in the guide path 66P and stops while the arm 70 keeps the second posture. In this course, the arm 70 keeps its posture in this final state by being configured as in the embodiment above.

The position at which the second gear is disposed in the guide path 66P is appropriately changed as described above, which enables to relatively freely design the state in which the arm 70 changes its posture.

The second gear may include the rack teeth provided entirely in the extending direction (longitudinal direction) of the guide path. In this case, the deceleration gear mechanism causes the arm to change its posture when moving through the entire guide path. In addition, in this case, the configuration is preferably made such that the multiple (three or more, more specifically, four) gears are provided to the deceleration gear mechanism and that the rotational movement through meshing with the second gear is decelerated and transferred as the rotational movement in which the arm is caused to change its posture through meshing with the first gear. More specifically, it suffices that one or more (for example, two) intermediate gears are provided between the second intermediate gear meshing with the second gear and the first intermediate gear meshing with the first gear so that the rotational movement of the second intermediate gear is decelerated and transferred to the first intermediate gear through the at least one intermediate gear. In this case, the rotational axis of the second intermediate gear and the rotational axis of the first intermediate gear do not have to be positioned coaxially.

It is not necessarily required that the vertically shielding window shade device 30 and the horizontally shielding window shade device 50 be provided as in the embodiment above, and the horizontally shielding window shade 52 may be used alone. Alternatively, the configuration described as to the horizontally shielding window shade 52 may be incorporated in a window shade device that shields a window horizontally and diagonally.

<Second Embodiment>

Figure 20:
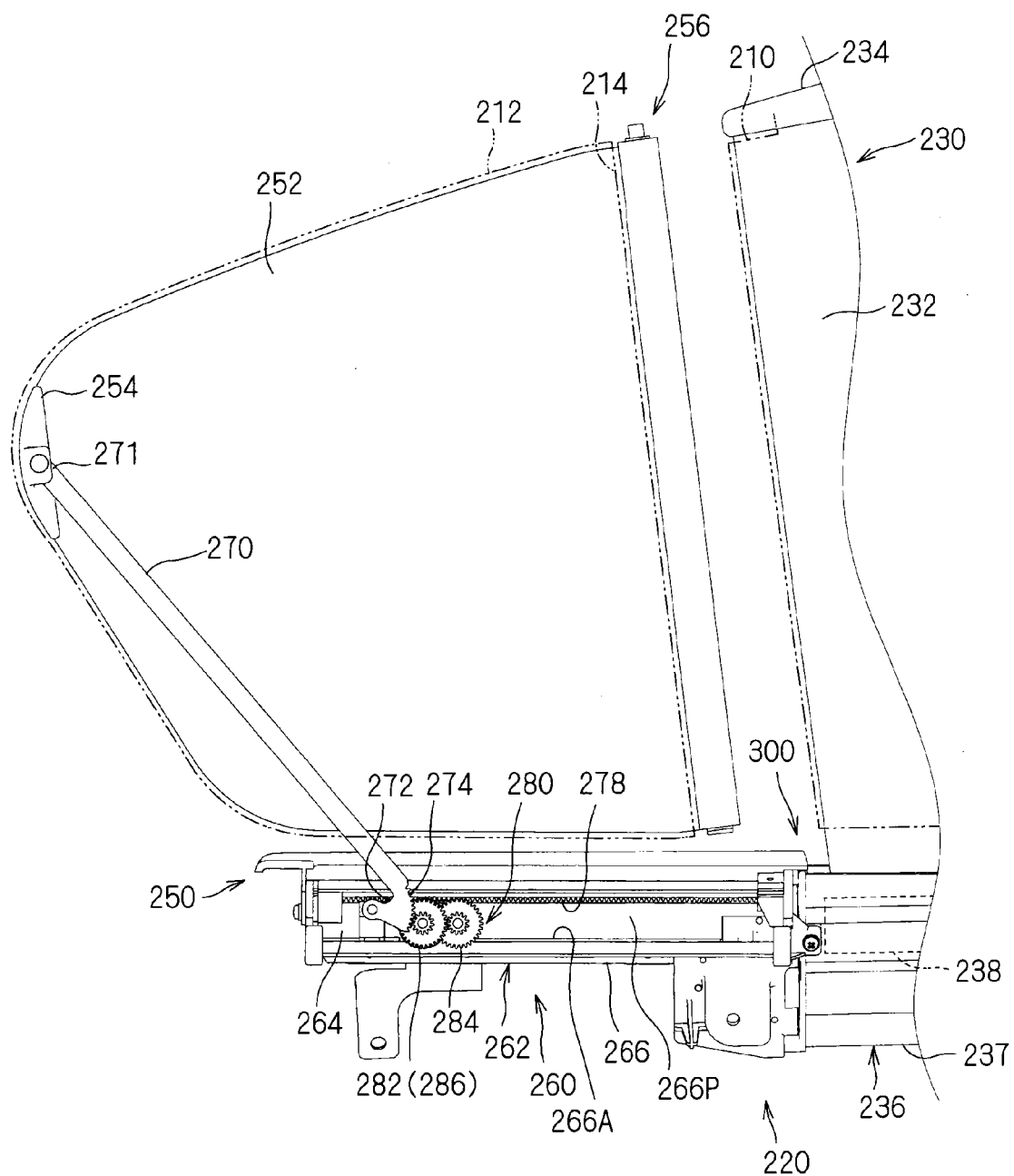
FIG. 20 is a side view showing a window shade device for vehicles according to a second embodiment.
Figure 21:
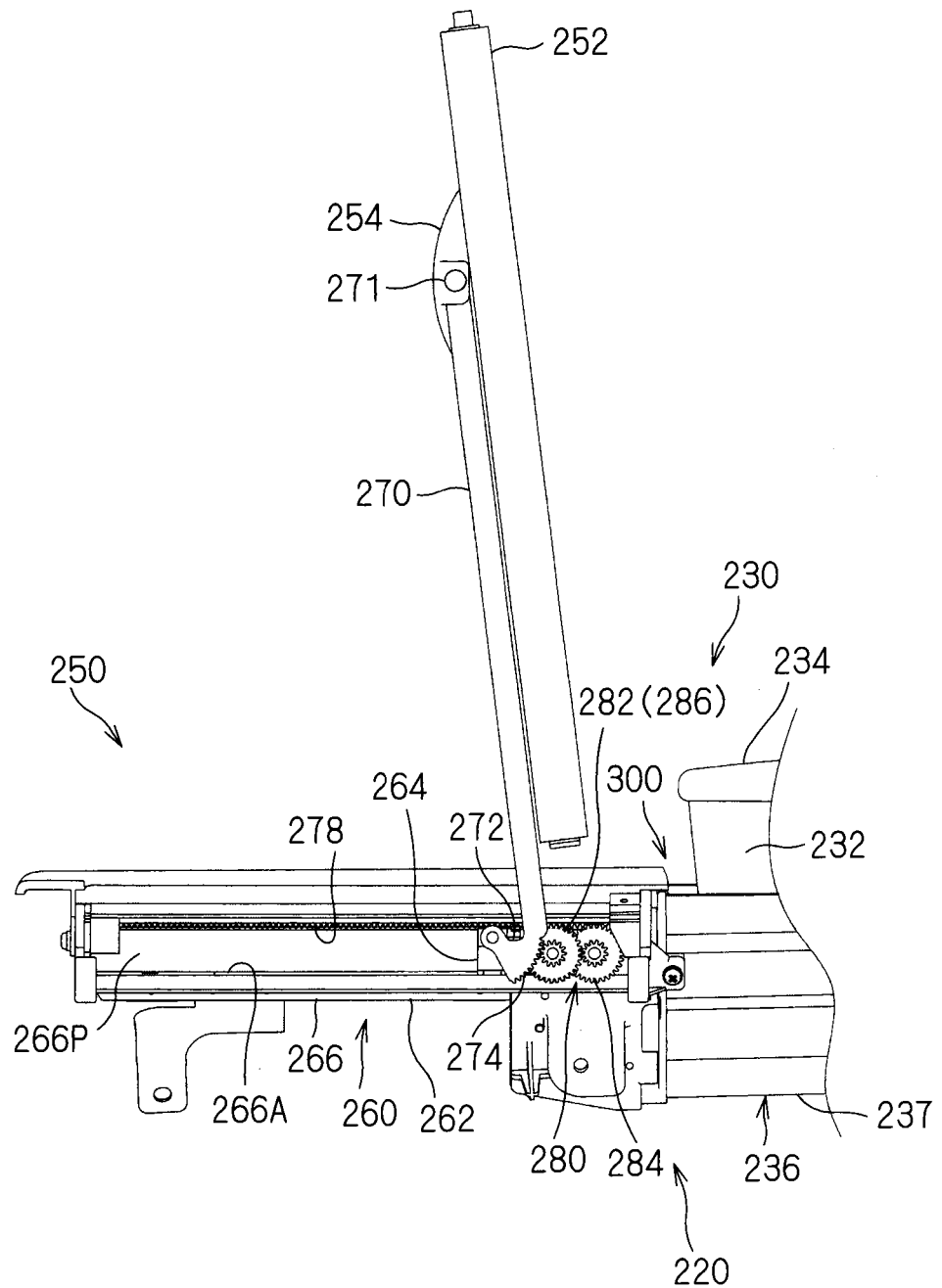
FIG. 21 is another side view showing the window shade device for vehicles.

A window shade device for vehicles according to a second embodiment is descried below. FIG. 20 is a side view showing a window shade device for vehicles 220 in the drawn state, and FIG. 21 is a side view showing the window shade device for vehicles 220 in the housed state, each of which shows the state when viewed from the outside of a vehicle.

The window shade device for vehicles 220 is incorporated in windows 210 and 212 adjacent to each other in the vehicle, and is configured so as to cover the windows 210 and 212 to be shielded and opened from the inside of the vehicle. Here, the rear side window 210 (first window, a part of which in the vehicle rear portion is shown in FIGS. 20 and 21) having an approximately square shape is provided in the vehicle, and the rear quarter window 212 (second window) having an approximately triangular shape is provided in the further vehicle rear portion from the rear side window 210. A pillar 214 is provided between the rear side window 210 and the rear quarter window 212.

The window shade device for vehicles 220 includes a vertically shielding window shade device 230 (first window shade device) for covering the rear side window 210 and a horizontally shielding window shade device 250 (second window shade device) for covering the rear quarter window 212. The horizontally shielding window shade device 250 operates for drawing/housing in association with the operation for drawing/housing by the vertically shielding window shade device 230.

<Vertically Shielding Window Shade Mechanism>

The vertically shielding window shade device 230 includes a vertically shielding window shade 232 (first window shade) and a vertically shielding windup device 236 (first windup device).

The vertically shielding window shade 232 is formed of a fabric, resin sheet, or the like into such a shape as to shade the rear side window 210. Here, the vertically shielding window shade 232 is formed in approximately the same size and shape as those of the rear side window 210. Mounted at the distal edge portion of the first window shade 232 is a stay 234 formed of a resin, metal, or the like into an approximately rod shape. The stay 234 can be fixed by, for example, being hooked to the vehicle side portion, which is located above the rear side window 210, in the state in which the vertically shielding window shade 232 is drawn.

The vertically shielding windup device 236 includes a windup shaft member 238 capable of winding up the vertically shielding window shade 232 and is configured to wind up the vertically shielding window shade 232 to be drawn/housed (as to windup shaft member 238, see FIG. 20).

That is, the vertically shielding windup device 236 is configured such that the windup shaft member 238 capable of winding up the vertically shielding window shade 232 is rotatably supported in a case 237 formed of a resin, metal, or the like. The windup shaft member 238 is biased in the direction in which the vertically shielding window shade 232 is wound up by the windup biasing member (not shown) such as a coil spring. When the stay 234 is pulled, the vertically shielding window shade 232 is drawn from the vertically shielding windup device 236 against the biasing force of the windup biasing member. Meanwhile, when the force of pulling the stay 234 is released, the vertically shielding window shade 232 is wound up by and housed in the vertically shielding windup device 236 by the biasing force acting on the windup shaft member 238 in the windup direction. The vertically shielding windup device 236 is incorporated in the vehicle along the lower edge of the rear side window 210. The vertically shielding window shade 232 is capable of shielding approximately the entire rear side window 210 by drawing the vertically shielding window shade 232 from below the rear side window 210 in this incorporated state.

<Horizontally Shielding Window Shade Mechanism>

The horizontally shielding window shade device 250 includes a horizontally shielding window shade 252 (second window shade), a horizontally shielding windup device 256 (second windup device), and a horizontally shielding open/close mechanism 260 (shielding open/close mechanism).

The horizontally shielding window shade 252 is formed of a fabric, resin sheet, or the like into such a shape as to shield the rear quarter window 212. Here, the horizontally shielding window shade 252 is formed into an approximately triangular shape obtained by rounding a distal edge portion thereof. Mounted at the distal edge portion of the horizontally shielding window shade 252 is a quarter stay 254 formed of a resin or the like into an approximately rod shape.

The horizontally shielding windup device 256 winds up the horizontally shielding window shade 252 substantially horizontally to be drawn/housed. That is, the horizontally shielding windup device 256 includes a windup shaft capable of winding up the horizontally shielding window shade 252. The windup shaft is biased in the direction in which the horizontally shielding window shade 252 is wound up by a coil spring (not shown) or the like. When the quarter stay 254 is pulled, the horizontally shielding window shade 252 is drawn from the horizontally shielding windup device 256 and covers the rear quarter window 212. Meanwhile, when the force of pulling the quarter stay 254 is released, the horizontally shielding window shade 252 is wound up by and housed in the horizontally shielding windup device 256 by the biasing force of the windup shaft in the windup direction. The horizontally shielding windup device 256 is fixed in such a posture as to extend upward, at the vehicle-rear-side end portion that is one end portion of the vertically shielding windup device 236. The horizontally shielding windup device 256 is incorporated in the pillar 214 located on the vehicle front side of the rear quarter window 212 and is disposed along the front side edge of the rear quarter window 212. Accordingly, the horizontally shielding window shade 252 covers the rear quarter window 212 to be drawn/housed substantially horizontally.

The horizontally shielding open/close mechanism 260 includes a guide and support mechanism 262, an arm 270, and a deceleration gear mechanism 280. The horizontally shielding open/close mechanism 260 is configured to draw and house the horizontally shielding window shade 252 by moving the arm 270 along the guide and support mechanism 262 and changing the posture of the arm 270 while moving the arm 270.

More specifically, the guide and support mechanism 262 includes a movable member 264 and a guide rail 266 (guide path member).

The guide rail 266 is configured so as to support the movable member 264 to move along the direction in which the horizontally shielding window shade 252 is drawn/housed. Here, the guide rail 266 is formed into an approximately tube shape (approximately rectangular tube shape), where an opening 266A extending along the longitudinal direction of the guide rail 266 is formed on one side surface. The inner peripheral surface of the guide rail 266 forms a guide path 266P that extends along the drawing/housing direction of the horizontally shielding window shade 252 and is open on one side surface through the opening 266A. One end portion of the guide rail 266 is fixed to the vehicle-rear-side end portion that is one end portion of the vertically shielding windup device 236 via, for example, a bracket. Accordingly, the guide rail 266 is fixed in such a posture as to extend substantially horizontally from vehicle-rear-side end portion of the vertically shielding windup device 236. The guide rail 266 is incorporated in a portion below the rear quarter window 212 in the car body and is disposed along the lower edge of the rear quarter window 212.

Figure 22:
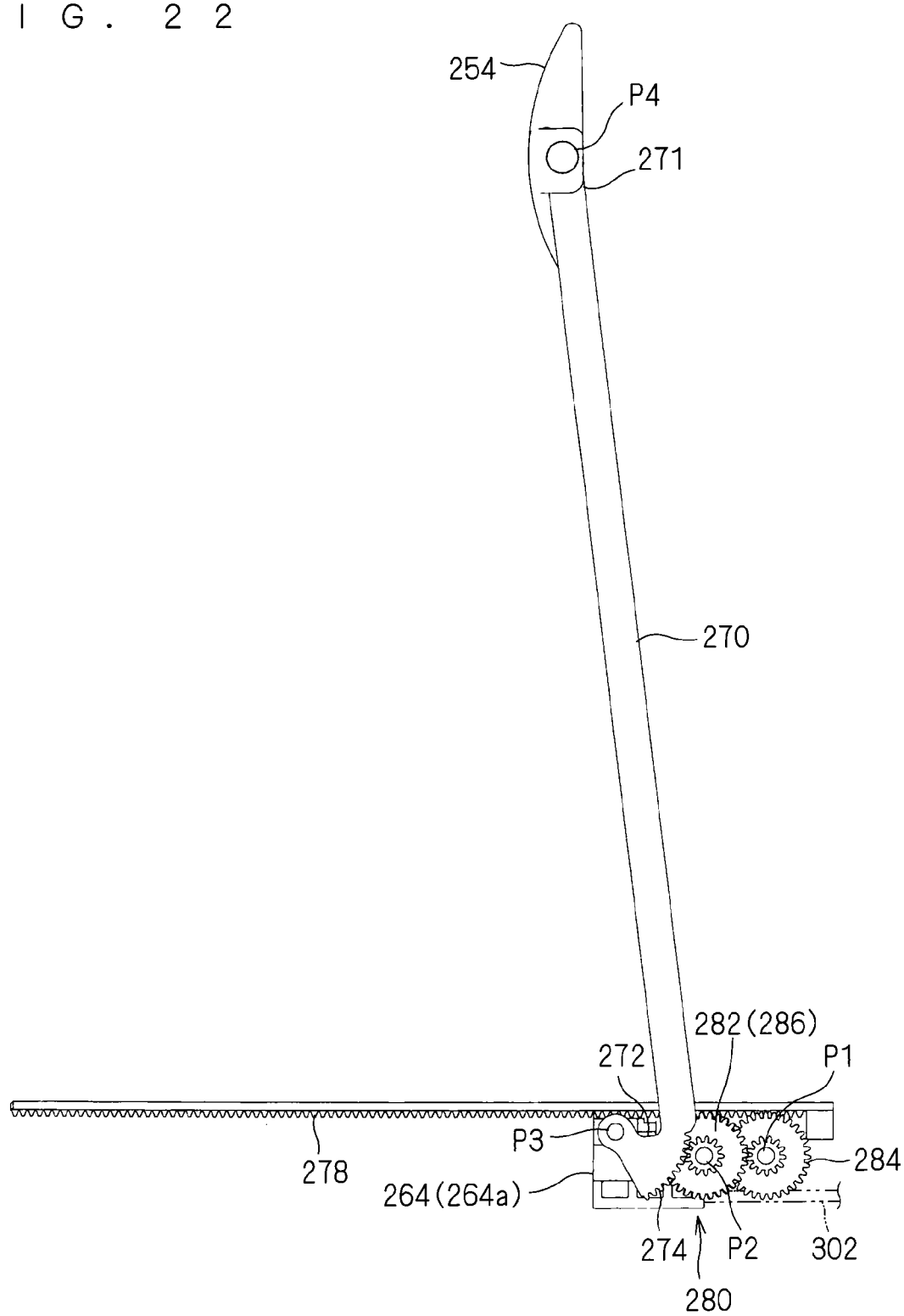
FIG. 22 is a side view showing a movable member, an arm, a second gear, and a deceleration gear mechanism.
Figure 23:
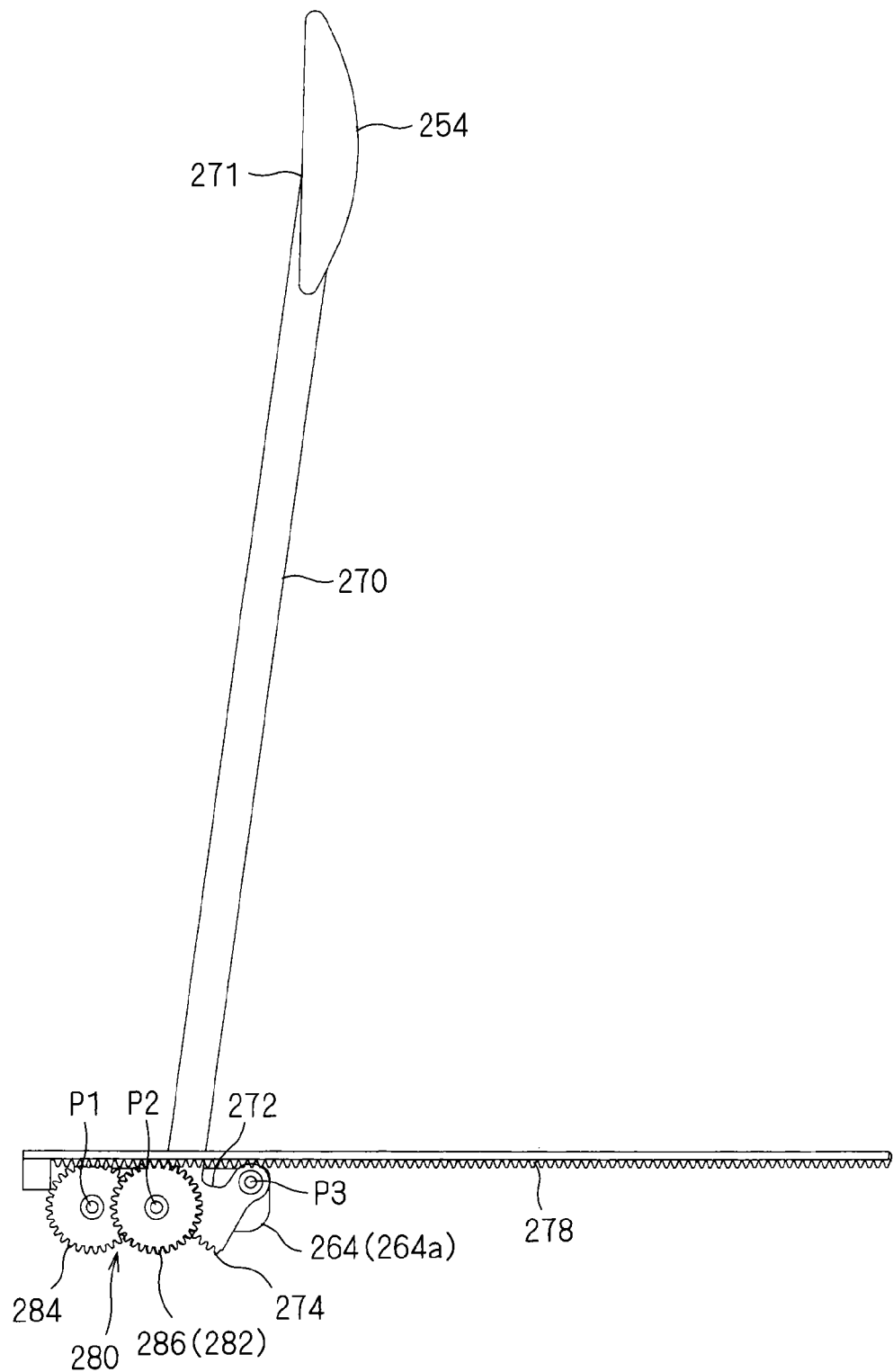
FIG. 23 is an explanatory view showing the relationship among the arm, the second gear, and the deceleration gear mechanism.
Figure 24:
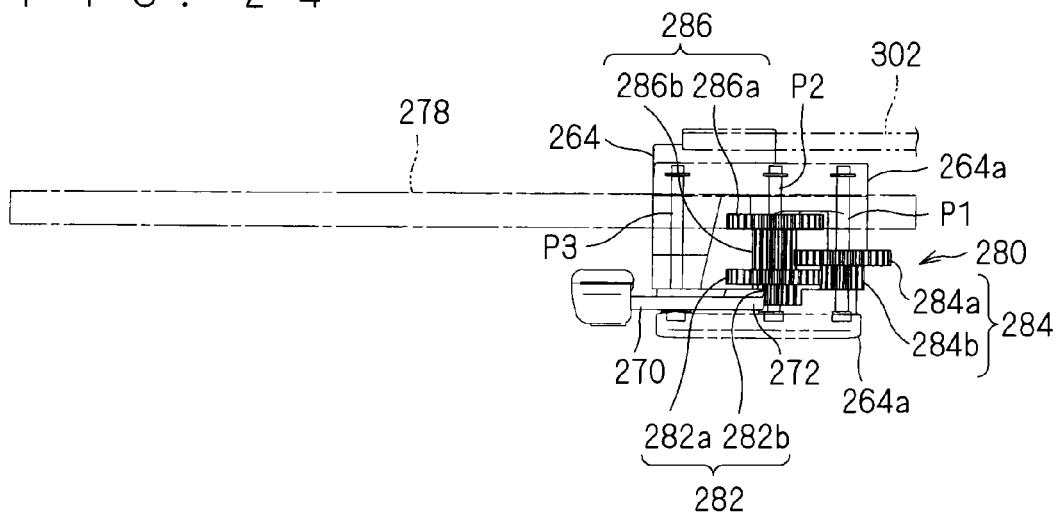
FIG. 24 is another explanatory view showing the relationship among the arm, the second gear, and the deceleration gear mechanism.
Figure 25:
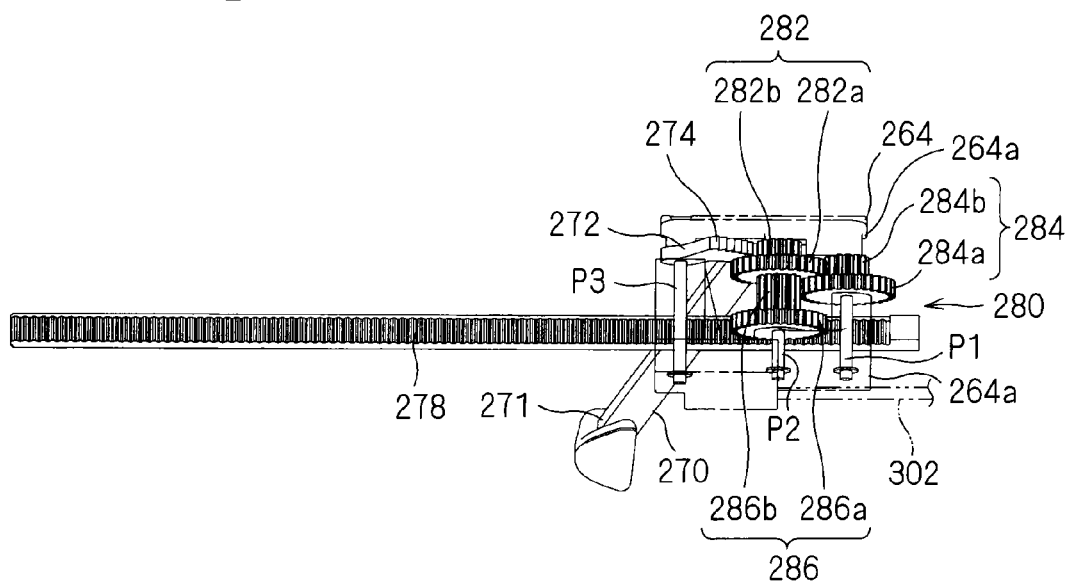
FIG. 25 is still another explanatory view showing the relationship among the arm, the second gear, and the deceleration gear mechanism.

FIG. 22 is a side view showing the movable member 264, the arm 270, the second gear 278, and the deceleration gear mechanism 280. FIGS. 23 to 25 are each an explanatory view showing the relationship among the arm 270, the second gear 278, and the deceleration gear mechanism 280, where FIG. 23 is a view when viewed from the opposite side of FIG. 22, FIG. 24 is a view when viewed from above, and FIG. 25 is a view when viewed from obliquely below. FIG. 26 is a perspective view showing the arm 270.

The movable member 264 is a member formed of a resin or the like, and is supported so as to move along the guide path 266P, that is, along the drawing/housing direction of the horizontally shielding window shade 252. Here, the movable member 264 includes a pair of movable side pieces 264a, and the pair of movable side pieces 264a are supported to be opposed to each other with an interval therebetween (see FIGS. 24 and 25). The movable member 264 is partially omitted in, for example, FIGS. 20 to 23 for showing the deceleration gear mechanism 280.

At least a part of the movable member 264 (here, one of the movable side pieces 264a) is disposed in the guide path 266P of the guide rail 266 and travels along the guide path 266P, and the remaining part of the movable member 264 (here, the other of the movable side pieces 264a) is exposed to the outside of the guide rail 266 through the opening 266A. The opening 266A may be formed only on the upper side surface of the guide path 266P such that the arm 270 can slide while projecting.

The movable member 264 supports the arm 270 and the deceleration gear mechanism 280. Here, the deceleration gear mechanism 280 is incorporated between the pair of movable side pieces 264a, and the other end (lower end) of the arm 270 is rotatably supported.

Now, description is given of an example of an associating mechanism that moves the movable member 264 in association with the operation for drawing/housing by the vertically shielding window shade device 230.

Figure 27:
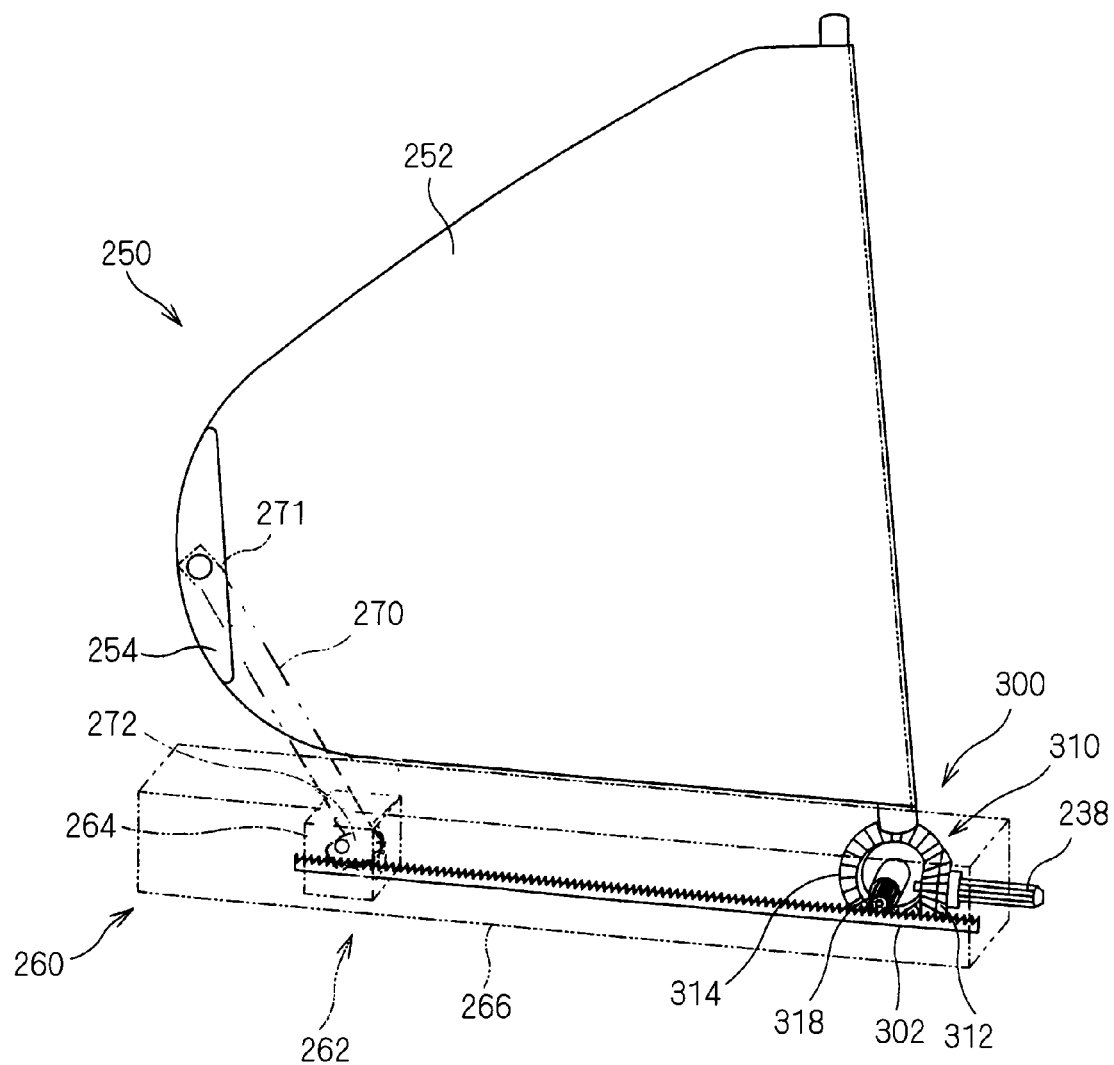
FIG. 27 is a schematic view showing an associating mechanism.

FIG. 27 is a schematic view showing an associating mechanism 300. Note that the deceleration gear mechanism 280 is not shown in FIG. 27. That is, the associating mechanism 300 includes an associating rack member 302 and an associating relay mechanism 310.

The associating rack member 302 is disposed so as to move along the longitudinal direction of the guide rail 266 and is coupled to the movable member 264. The associating rack member 302 may be disposed in the guide rail 266 or may be disposed outside the guide rail 266. The movable member 264 is configured to move, when the associating rack member 302 moves along the guide rail 266, in the drawing/housing direction along the guide rail 266 in accordance with the moving direction and moving amount of the associating rack member 302.

More specifically, the associating rack member 302 is linearly formed, and a plurality of teeth are formed in a line on one surface thereof. Here, the associating rack member 302 is supported so as to move along the guide rail 266 with the plurality of teeth facing upward. The associating rack member 302 may be formed of a flexible member such as a resin, which is preferably rigid so as not to bend easily when being pushed. The associating rack member 302 is disposed on the proximal end side of the guide rail 266 so as to extend from the guide rail 266. In a case where the movable member 264 moves toward the housing direction side of the horizontally shielding window shade 252, the end portion of the associating rack member 302 is configured to escape toward the outside of the guide rail 266 on the proximal end side. The movable member 264 is fixed to the vehicle-rear-side end portion of the associating rack member 302. The movable member 264 and the associating rack member 302 are fixed to each other by or various fixing structures as such as a sandwiching structure and screwing. The associating rack member 302 is moved to advance and retract along the longitudinal direction thereof, so that the movable member 264 reciprocates along the guide path 266P.

The associating relay mechanism 310 includes a first bevel gear 312 and a second bevel gear 314. It suffices that the first bevel gear 312, the second bevel gear 314, and the like are incorporated in, for example, a case-like portion provided between the guide rail 266 and the vertically shielding windup device 236. The rotational movement of the windup shaft member 238 of the vertically shielding windup device 236 is transferred through meshing of the first bevel gear 312 and the second bevel gear 314 as the force for moving the associating rack member 302 along the guide rail 66.

That is, the first bevel gear 312 is rotatably coupled to the windup shaft member 238 of the vertically shielding windup device 236 in association with the windup shaft member 238. Here, the first bevel gear 312 is directly coupled to the windup shaft member 238 of the first windup device 236 to rotate integrally with the windup shaft member 238. Needless to say, another spur gear, transfer belt, and the like may be provided between the first bevel gear 312 and the windup shaft member 238. That is, it suffices that the first bevel gear 312 rotates in accordance with the rotation timing and rotation direction of the windup shaft member 238.

The second bevel gear 314 is disposed so as to mesh with the first bevel gear 312. That is, the second bevel gear 314 is disposed in a manner that the rotational axis of the first bevel gear 312 and the rotational axis of the second bevel gear 314 intersect each other. Integrated with the second bevel gear 314 is a spur gear 318 that has a rotational axis coinciding with the rotational axis thereof. The spur gear 318 is disposed so as to mesh with the associating rack member 302 in the case-like portion between the guide rail 266 and the vertically shielding windup device 236. When the spur gear 318 rotates upon rotation of the second bevel gear 314, the rotational movement thereof is transferred as the force for linearly moving the associating rack member 302 along the guide rail 266.

The association operation of the associating relay mechanism 310 is described.

That is, when the vertically shielding window shade 232 is drawn, the windup shaft member 238 of the vertically shielding windup device 236 rotates in the drawing direction. The first bevel gear 312 rotates in association with the rotation of the windup shaft member 238, and the second bevel gear 314 meshing with the first bevel gear 312 rotates as well. The spur gear 318 rotates in association with the rotation of the second bevel gear 314, and the associating rack member 302 meshing with the spur gear 318 is delivered toward the guide rail 266 side. Then, the movable member 264 moves toward the drawing direction side along the guide rail 266.

Meanwhile, in a case where the vertically shielding window shade 232 is wound up by the windup force of the windup shaft member 238 of the vertically shielding windup device 236, the rotational force of the windup shaft member 238 is transferred to the associating rack member 302 via the first bevel gear 312, the second bevel gear 314, and the spur gear 318. Accordingly, the associating rack member 302 moves along the guide rail 266 and is delivered toward the vertically shielding windup device 236 side. Then, the movable member 264 moves toward the housing direction side along the guide rail 266.

Note that the configuration in which the movable member 264 is moved along the guide path 266P is not limited to the example above. The configuration may be made such that the movable member 264 is moved by, for example, pulling or feeding a wire or the like by the driving force of the actuator such as a motor. The configuration may be made such that for example, the driving force of the actuator such as a motor or the operating force of a person acts as the force of moving the movable member 264 directly without involving the vertically shielding window shade device 30.

Now returning back to FIGS. 20 to 26, the arm 270 is formed of metal, a resin, or the like into an elongated rod shape. The arm 270 may bend into an approximately L-shape in accordance with, for example, the positional relationship between the movable member 264 and the horizontally shielding windup device 256. One end portion (upper end portion) of the arm 270 is a shade coupling part 271 rotatably coupled to the quarter stay 254 of the drawing-side edge portion of the horizontally shielding window shade 252 via a pin P4. The other end portion (lower end portion) of the arm 270 is formed into a U-shaped part 272 bent into a U-shape, and a distal end portion thereof is rotatably coupled to the side surface of the movable member 264 via a pin P3. The arm 270 can change its posture between a first posture (see FIG. 21) in which the shade coupling part 271 is located on the housing direction side of the horizontally shielding window shade 252 and a second posture (see FIG. 20) in which the shade coupling part 271 is located on the drawing direction side of the horizontally shielding window shade 252.

More specifically, in the first posture, the arm 270 is disposed along the horizontally shielding windup device 256. Accordingly, in the state in which the horizontally shielding window shade 252 is housed, the arm 270 is disposed along the horizontally shielding windup device 256 and is less visually conspicuous. The movable member 264 is moved from this state, whereby the horizontally shielding window shade 252 can be drawn.

In the second posture, the shade coupling part 271 is tilted toward the drawing direction side of the horizontally shielding window shade 252 with respect to the first posture. In the moving direction of the movable member 264, the shade coupling part 271 is positioned to be more apart from the movable member 264 toward the drawing direction side in the case of the second posture compared with the case of the first posture. This enables to move the shade coupling part 271 for a distance larger than the moving distance of the movable member 264 such that the horizontally shielding window shade 252 is drawn for a larger amount. The arm 270 is constantly biased toward the first posture side by the biasing force acting on the windup shaft of the horizontally shielding windup device 256.

Provided at the other end portion of the arm 270, here, at a part of the outer periphery of the U-shaped potion 272 is a first gear 274. The first gear 274 is an arc-shaped gear whose center (center of curvature) is the center of rotation when the arm 270 changes its posture, where a plurality of teeth are formed on the outer peripheral surface thereof. The relative relationship between the first gear 274 and the deceleration gear mechanism 280 is further described below.

The second gear 278 is a kind of rack gear and is provided to at least a part of the guide path 266P. More specifically, the second gear 278 is formed of a resin or the like and is formed by forming a plurality of gear teeth in one side portion of a rod-like member having approximately the same length dimension as that of the guide path 266P. This second gear 278 is disposed and fixed along the guide path 266P in the posture in which the gear teeth thereof are directed to mesh with a second intermediate gear 286a of the movable member 264 moving along the guide path 266P (here, downwardly), so that the rack teeth extending along the guide path 266P are provided in at least a part of the guide path 266P.

The portion of the second gear 278 in which the gear teeth are formed may be a portion corresponding to the entire length of the guide path 266P or may be a section corresponding to a part of the guide path 266P. In order to cause the arm 270 to change its posture from the first posture to the second posture and vice versa upon movement of the movable member 264 through the entire guide path 266P, it is preferable that the second gear 278 be provided in such a section as to mesh with the second intermediate gear 286a described below in the entire travel in which the movable member 264 moves through the guide path 266P. In other words, preferably, the second gear 278 is formed in a section between the positions of the second intermediate gear 286a in the states in which the movable member 264 is positioned at the one end and the other end of the guide path 266P. In the case in which the gear teeth are formed in a part of the guide path 266P, it is preferable to dispose a rod-like member in a part of the guide path 266P or recess the rod-like member in the sections other than the section in which the gear teeth are formed, so that the rod-like member and the second intermediate gear 286a do not interfere with each other.

The deceleration gear mechanism 280 is provided so as to individually mesh with the first gear 274 and the second gear 278 and is configured to decelerate and transfer the rotational movement caused by meshing with the second gear 278 as the rotational movement for causing the arm 270 to change its posture between the first posture and the second posture through meshing with the first gear 274. Here, the deceleration and transfer of a force by the deceleration gear mechanism 280 refers to that the length for meshing with the first gear 274 is smaller than the length for meshing with the second gear 278 caused by the movement of the movable member 264 for a predetermined length, in other words, refers to the case in which the moving distance around a pitch circle of the first gear 274 is smaller than a predetermined moving distance of the movable member 264, and accordingly, a small force is converted into a larger force and transferred.

Here, the deceleration gear mechanism 280 includes a first intermediate gear member 282 including a first intermediate gear 282b meshing with the first gear 274, a second intermediate gear member 286 including the second intermediate gear 286a meshing with the second gear 278, and an relay deceleration gear member 284 provided between the first intermediate gear member 282 and the second intermediate gear member 286, which are formed of metal, a resin, or the like. The relay deceleration gear member 284 is configured to decelerate the rotational movement on the second intermediate gear member 286 side to transfer the rotational movement to the first intermediate gear member 282 side.

More specifically, the first intermediate gear member 282 is configured such that the first intermediate gear 282b being a small-diameter gear and a large-diameter gear 282a having a larger diameter than that of the first intermediate gear 282b are integrated with each other so as to be coaxially centered. In addition, the second intermediate gear member 286 is configured such that the second intermediate gear 286a being a large-diameter gear and a small-diameter gear 286b having a smaller diameter than that of the second intermediate gear 286a are integrated with each other so as to be coaxially centered.

The relay deceleration gear member 284 is configured such that a large-diameter gear 284a and a small-diameter gear 284b having a smaller diameter than that of the large-diameter gear 284a are integrated with each other so as to be coaxially centered.

The first intermediate gear 282b, large-diameter gear 282a, second intermediate gear 286a, small-diameter gear 286b, large-diameter gear 284a, and small-diameter gear 284b are each a gear that draws one circle. It suffices that as a whole, the rotational movement is decelerated and transferred in the deceleration gear mechanism 280. For example, the large-diameter gear 282a or the small-diameter gear 286b may be omitted in the first intermediate gear member 282 or the second intermediate gear member 286. Alternatively, a plurality of relay deceleration gear members 284 may be provided.

The first intermediate gear member 282, the relay deceleration gear member 284, and the second intermediate gear member 286 sequentially mesh with each other so as to decelerate and transfer the rotational speed. More specifically, the small-diameter gear 286b of the second intermediate gear member 286 meshes with the large-diameter gear 284a of the relay deceleration gear member 284, and the small-diameter gear 284b of the relay deceleration gear member 284 meshes with the large-diameter gear 282a of the first intermediate gear member 282. Then, as the movable member 264 moves, the second gear 278 and the second intermediate gear 286a of the second intermediate gear member 286 mesh with each other, and the second intermediate gear member 286 rotates. Accordingly, the rotational movement is decelerated and is transferred to the relay deceleration gear member 284 through meshing of the small-diameter gear 286b of the second intermediate gear member 286 and the large-diameter gear 284a of the relay deceleration gear member 284. The rotational movement of the relay deceleration gear member 284 is decelerated and transferred to the first intermediate gear member 282 through meshing of the small-diameter gear 284b of the relay deceleration gear member 284 and the large-diameter gear 282a of the first intermediate gear member 282. The rotational movement of the first intermediate gear member 282 is decelerated and transferred as the movement for causing the arm 270 to change its posture through meshing of the first intermediate gear 282b of the first intermediate gear member 282 and the first gear 274 of the other end of the arm 270.

Here, in particular, the relay deceleration gear member 284 is provided between the first intermediate gear member 282 and the second intermediate gear member 286, which enables to further decelerate the rotational movement of the second intermediate gear member 286 and transfer the rotational movement to the first intermediate gear member 282.

Here, a degree of deceleration (deceleration rate) of the deceleration gear mechanism 280 is set to such an extent that the arm 270 is caused to change its posture from the first posture to the second posture and vice versa upon movement of the movable member 264 through the entire guide path 266P.

A part of the rotational axis of the first intermediate gear member 282, that of the relay deceleration gear member 284, and that of the second intermediate gear member 286 are disposed coaxially.

Here, the rotational axis of the first intermediate gear member 282 and the rotational axis of the second intermediate gear member 286 are disposed coaxially, and the rotational axis of the relay deceleration gear member 284 is disposed adjacent to those rotational axes.

More specifically, the three pins P1, P2, and P3 are supported between the pair of movable side pieces 264a of the movable member 264. The pins P1, P2, and P3 are postured to be perpendicular to the extending direction of the guide path 266P. The pins P1, P2, and P3 are supported at intervals in the stated order from the proximal end side to the distal end side of the guide path 266P along the extending direction of the guide path 266P. The pins P1, P2, and P3 may be displaced in the direction (vertically) in which they become apart from the guide path 266P and, here, the pin P3 is displaced from the pins P1 and P2 upwardly (in this case, slightly upwardly).

The relay deceleration gear member 284 is rotatably supported by the pin P1. The first intermediate gear member 282 and the second intermediate gear member 286 are rotatably supported coaxially by the pin P2. The second intermediate gear member 286 is disposed on such a side as to mesh with the second gear 278 in the guide path 266P, and the first intermediate gear member 282 is out of the guide path 266P and is disposed on such a side as to mesh with the arm 270.

The other end portion (lower end portion) of the arm 270 is rotatably supported by the pin P3. Accordingly, the rotational axis of the first gear 274 at the lower end portion of the arm 270 is disposed at a position different from those of the rotational axes of the first intermediate gear member 282, relay deceleration gear member 284, and second intermediate gear member 286. Moreover, the rotational axis of the first gear 274 is disposed at a position spaced from the rotational axes of the first intermediate gear member 282, relay deceleration gear member 284, and second intermediate gear member 286 along the guide path 266P.

The relationship of meshing in the state where the gears are rotatably supported in the above-mentioned manner is as described above.

Figure 28:
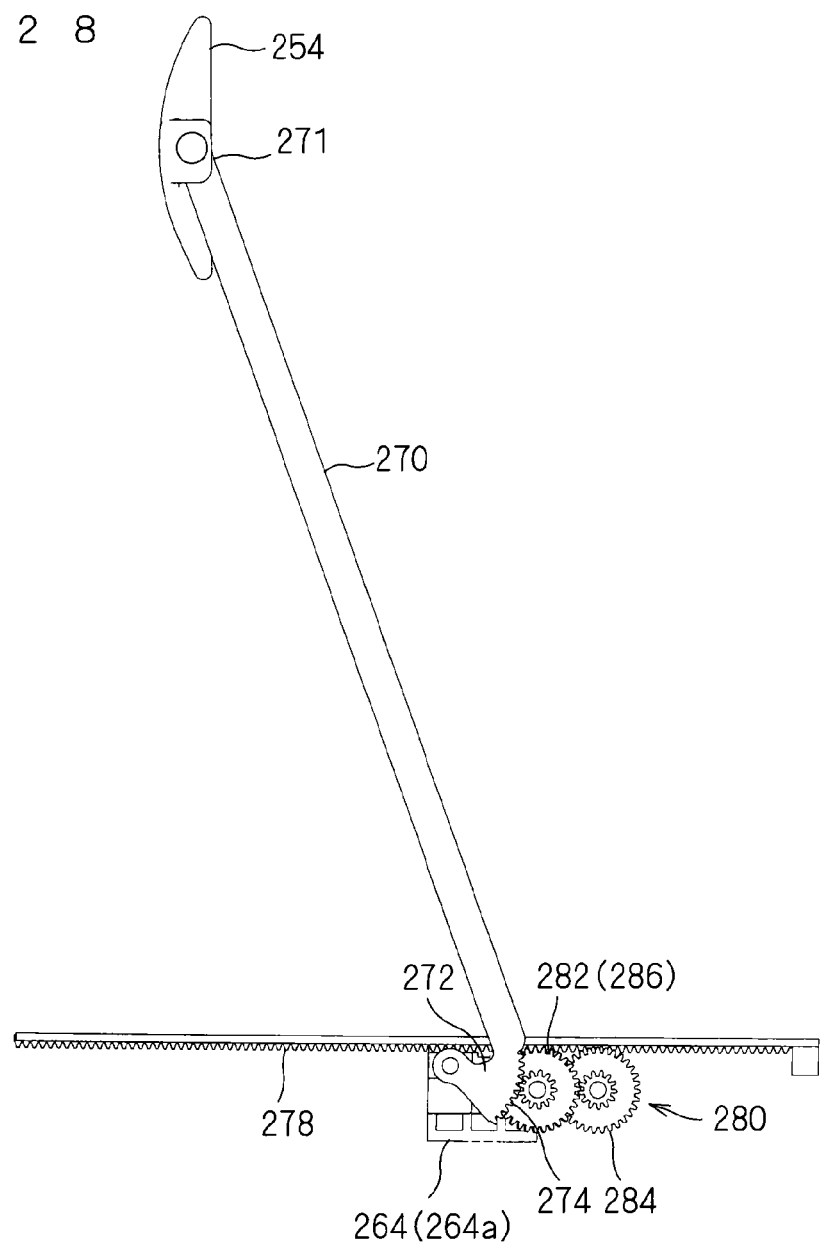
FIG. 28 is an explanatory view showing an operation of a horizontally shielding open/close mechanism.
Figure 29:
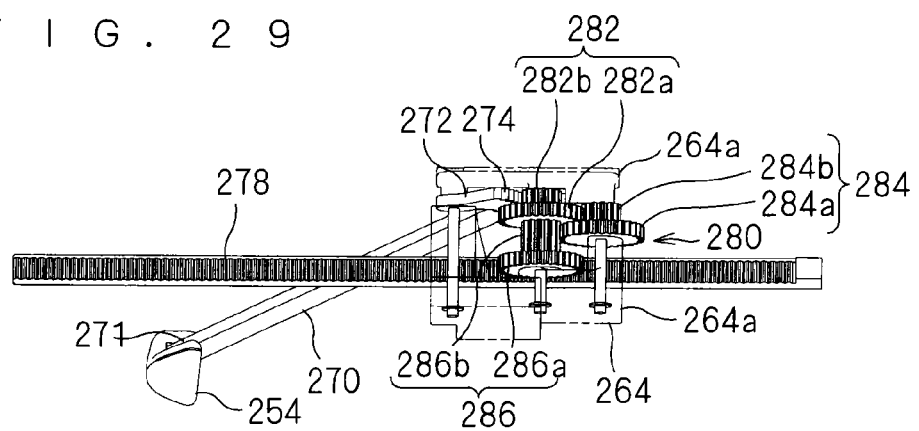
FIG. 29 is an explanatory view showing the operation of the horizontally shielding open/close mechanism.
Figure 30:
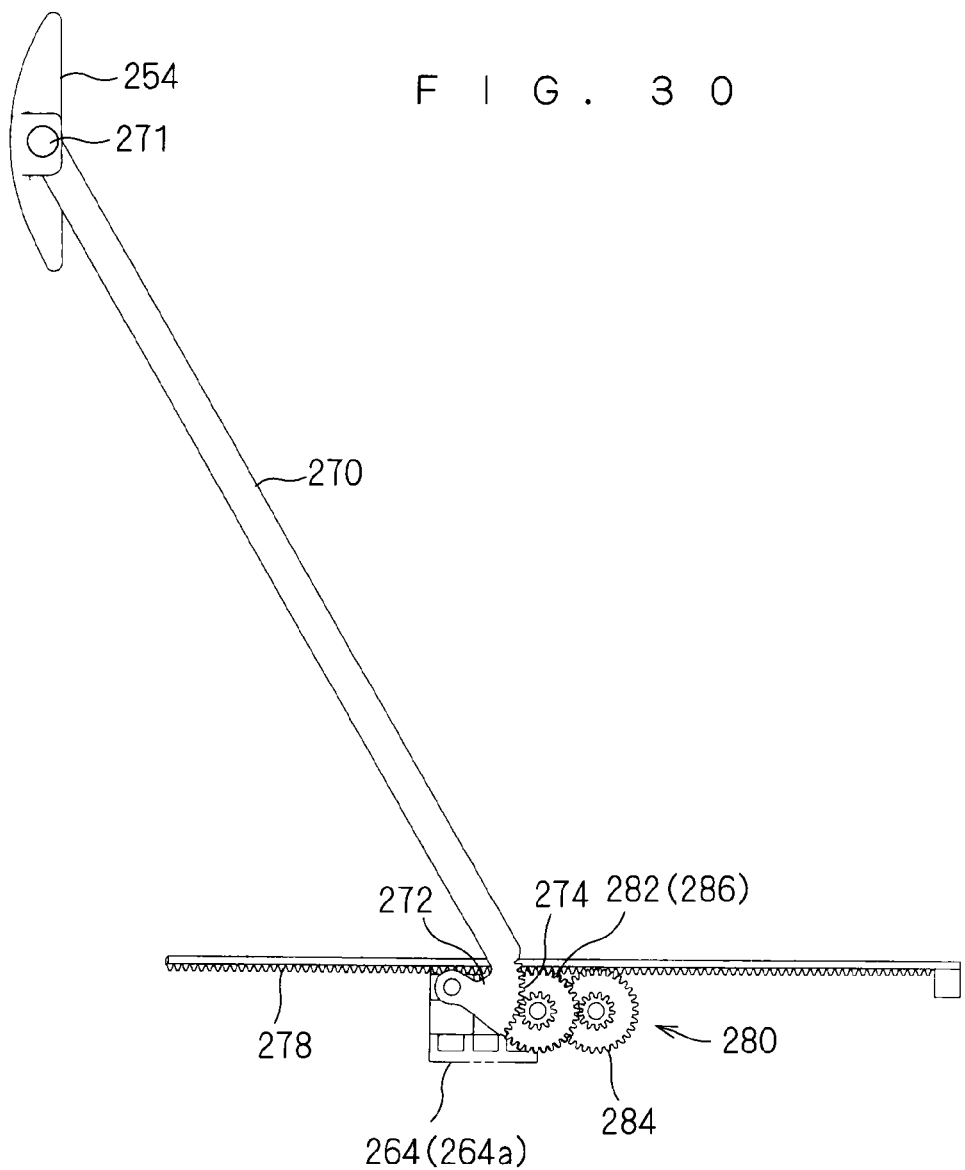
FIG. 30 is an explanatory view showing the operation of the horizontally shielding open/close mechanism.
Figure 32:
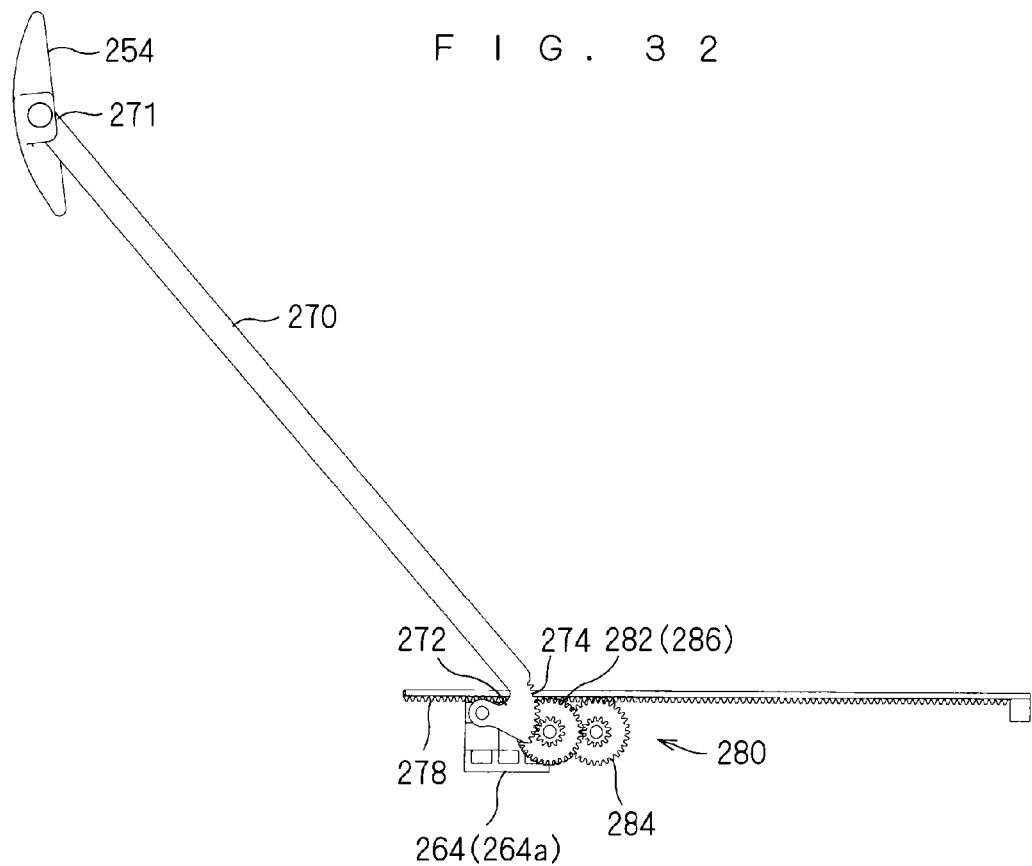
FIG. 32 is an explanatory view showing the operation of the horizontally shielding open/close mechanism.
Figure 33:
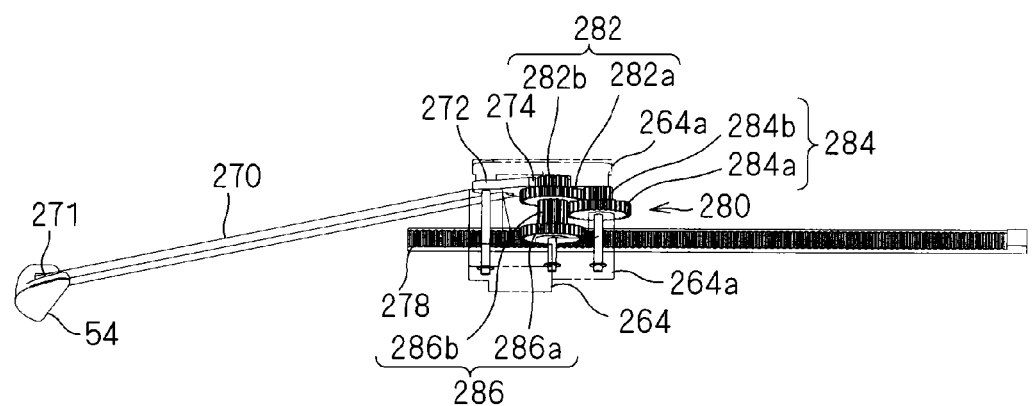
FIG. 33 is an explanatory view showing the operation of the horizontally shielding open/close mechanism.

The operation of the horizontally shielding open/close mechanism 260 of the horizontally shielding window shade device 250 is described. FIGS. 28, 30, and 32 are each an explanatory view of the side surface, which shows the operation of the horizontally shielding open/close mechanism 260 when the movable member 264 is moved from the housing side to the drawing side of the horizontally shielding window shade 252, and FIGS. 29, 31, and 33 are each an explanatory view which shows the same operation from obliquely below.

First, in the state in which the movable member 264 is located on the housing-direction-side edge portion of the horizontally shielding window shade 252 in the guide path 266P, as shown in FIGS. 21 to 25, the second intermediate gear 286a of the second intermediate gear member 286 meshes with the second gear 278 on the housing-direction-side edge portion. In the state in which the first gear 274 of the arm 270 meshes with the first intermediate gear 282b of the first intermediate gear member 282, the arm 270 is in the state of being disposed along the horizontally shielding windup device 256 (that is, first posture).

From this state, the movable member 264 moves toward the drawing direction side of the horizontally shielding window shade 252 along the guide path 266P by the force via the associating mechanism 300 and the like. Then, as shown in FIGS. 28 and 29, the second intermediate gear member 286 rotates upon meshing of the second gear 278 and the second intermediate gear 286a of the second intermediate gear member 286, and this rotational movement is decelerated and transferred to the first gear 274 via the relay deceleration gear member 284 and the second intermediate gear member 286. This causes the arm 270 to change its posture from the first posture to the second posture.

Figure 31:
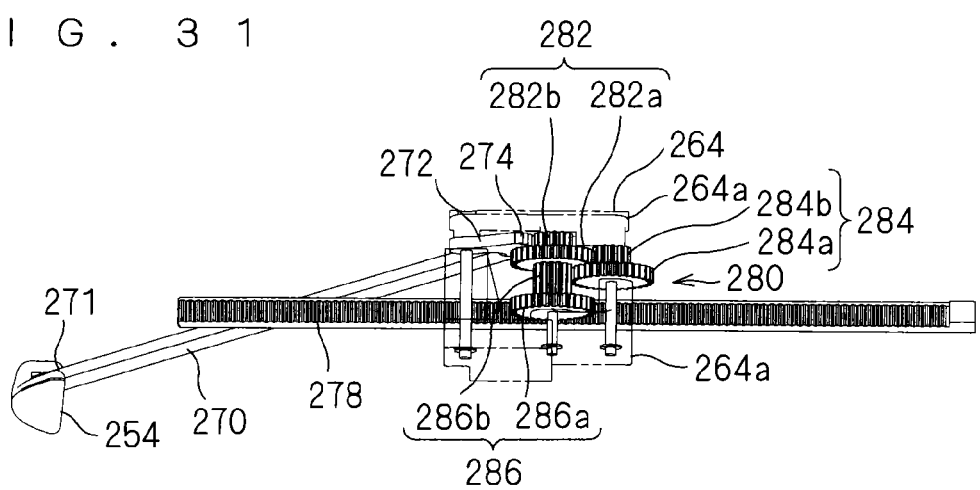
FIG. 31 is an explanatory view showing the operation of the horizontally shielding open/close mechanism.

The movable member 264 further moves along the guide path 266P toward the drawing direction side of the horizontally shielding window shade 252, whereby the arm 270 further changes its posture from the first posture to the second posture as shown in FIGS. 30 and 31.

Then, as shown in FIGS. 32 and 33, the movable member 264 reaches the drawing-direction-side edge portion along the guide path 266P, in other words, the second intermediate gear member 286 reaches the drawing-direction-side edge portion of the second gear 278, whereby the arm 270 has just finished the posture change to the second posture. As a result, the horizontally shielding window shade 252 is drawn so as to cover the rear quarter window 212 almost entirely. In this state, the movable member 264 is kept stopping, so that the arm 270 is kept in the second posture.

The operation of the horizontally shielding open/close mechanism 260 when the movable member 264 is moved from the drawing side to the housing side of the horizontally shielding window shade 252 is opposite to the above-mentioned operation.

According to the horizontally shielding window shade device 250 configured as described above, the first intermediate gear 282b of the deceleration gear mechanism 280 meshes with the first gear 274 and the second intermediate gear 286a meshes with the second gear 278, whereby the arm 270 can be caused to change its posture. Accordingly, the horizontally shielding window shade 252 can be drawn for a large amount by causing the arm 270 to change its posture while moving along the guide path 266P together with the movable member 264. In this case, the deceleration gear mechanism 280 decelerates and transfers the rotational movement of the second intermediate gear member 286 through meshing of the second gear 278 and the second intermediate gear 286a as the rotational movement for causing the arm 270 to change its posture through meshing of the first intermediate gear 282b and the first gear 274, which enables to cause the arm 270 to change its posture with a smaller force.

The rotational movement of the second intermediate gear member 286 is transferred to the first intermediate gear member 282 via the relay deceleration gear member 284, whereby the rotational movement can be decelerated and transferred more effectively. This causes the arm 270 to change its posture slowly in a longer section in the guide path 266P.

In particular, the members each obtained by integrating a large-diameter gear and a small-diameter gear so as to be coaxially centered are used for the first intermediate gear member 282, second intermediate gear member 286, and relay deceleration gear member 284. Accordingly, the rotational movement can be effectively decelerated and transferred in order.

In the present embodiment, the arm 270 changes its posture between the first posture and the second posture upon movement of the movable member 264 through the entire guide path 266P, which allows the arm 270 to change its posture more slowly.

Moreover, parts of the first intermediate gear member 282, second intermediate gear member 286, and relay deceleration gear member 284 are disposed coaxially, and in this case, the first intermediate gear member 282 and the second intermediate gear member 286 are disposed coaxially, which allows the deceleration gear mechanism 280 to be compact (in particular, to be compact in the extending direction of the guide path 266P). In addition, the above is conducive to reductions of part count and assembly man-hours. Further, the first intermediate gear member 282 and the second intermediate gear member 286 are supported coaxially, and thus, a positional tolerance of axes can be set small more easily compared with the case in which a positional tolerance of axes is set in consideration of the relationship among multiple axes. This also leads to an advantage that the accuracy of meshing of gears can be increased more easily.

Here, the rotational axes of the first intermediate gear member 282 and second intermediate gear member 286 and the rotational axis of the relay deceleration gear member 284 are disposed at intervals along the guide path 266P, and thus, a projected area of the deceleration gear mechanism 280 in the direction of the guide path 266P can be reduced (here, the height can be reduced). This enables to prevent the guide and support mechanism 262 including the movable member 264 from becoming large, in particular, becoming large in the height direction.

As described above, a plurality of relay deceleration gear members 284 may be provided. It suffices that in such a case, the rotational axes thereof and the rotational axes of the first intermediate gear member 282 and second intermediate gear member 286 are set coaxially in a partial manner, or the axes are disposed at intervals in the extending direction of the guide path 266P.

The first gear 274 is disposed at a position different from those of the rotational axes of the first intermediate gear member 282, second intermediate gear member 286, and relay deceleration gear member 284, and thus is excellent in flexibility in design such as the gear diameter and center of rotation of the first gear 274. Accordingly, the arm 270 can be easily set to change its posture or gradually change its posture with a force as small as possible by, for example, setting the gear diameter of the first gear 274 large.

The rotational axis of the first gear 274 is disposed at a position spaced from the rotational axes of the first intermediate gear member 282, second intermediate gear member 286, and relay deceleration gear member 284 along the guide path 266P. Therefore, also in terms of this position setting, the projected areas of the deceleration gear mechanism 280 and first gear 274 in the guide path 266P direction can be made small (here, the heights thereof can be made small). This enables to prevent the guide and support mechanism 262 including the movable member 264 and the first gear 274 from becoming large, in particular, becoming large in the height direction.

{Modification}

A modification that assumes the second embodiment above is described. The present modification is different from the embodiment above in the portion regarding a deceleration gear mechanism 380 and an arm 370 including a first gear 374, which is mainly described below.

Figure 34:
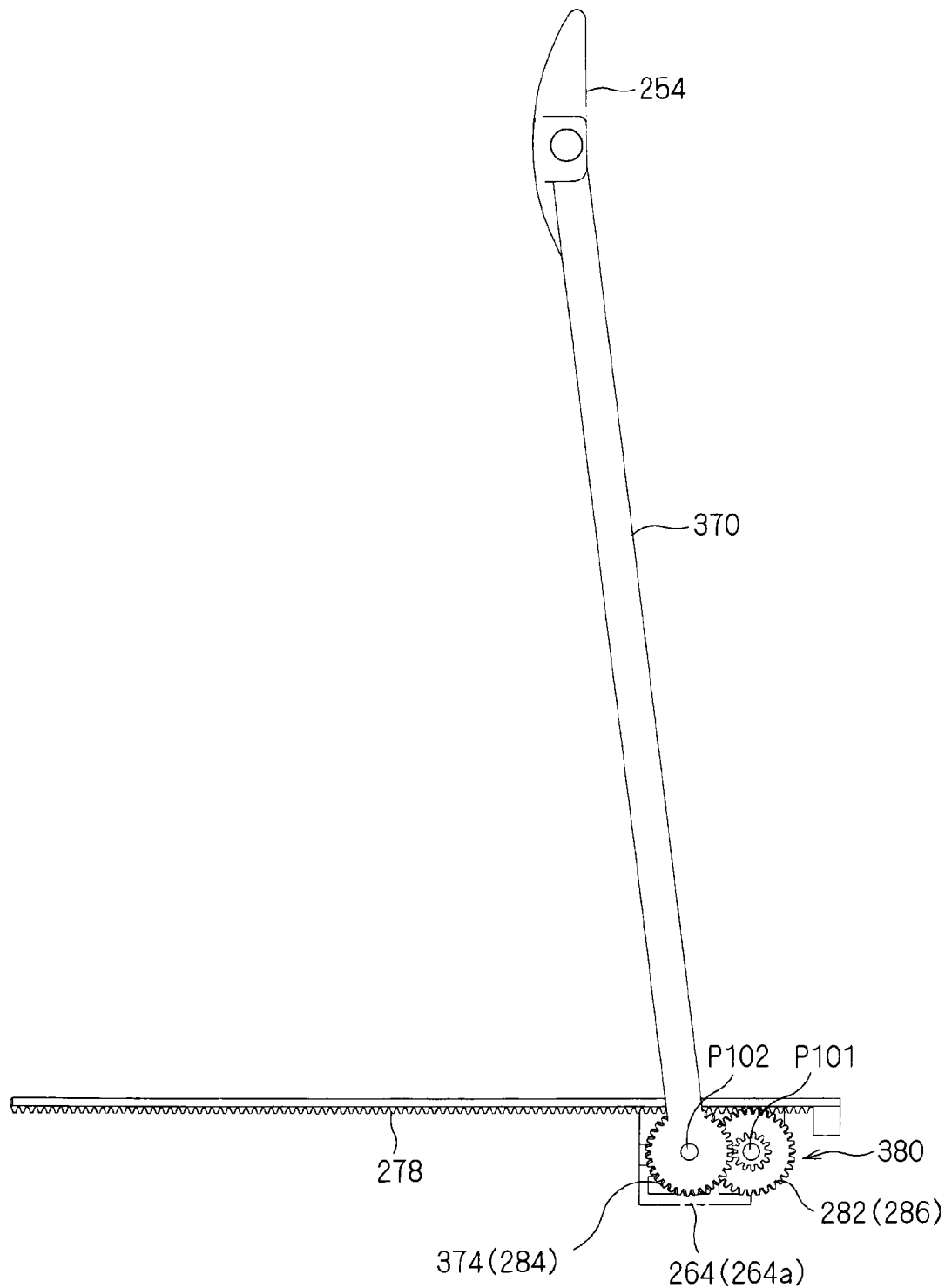
FIG. 34 is a side view showing a movable member, an arm, a second gear, and a deceleration gear mechanism according to a modification.
Figure 35:
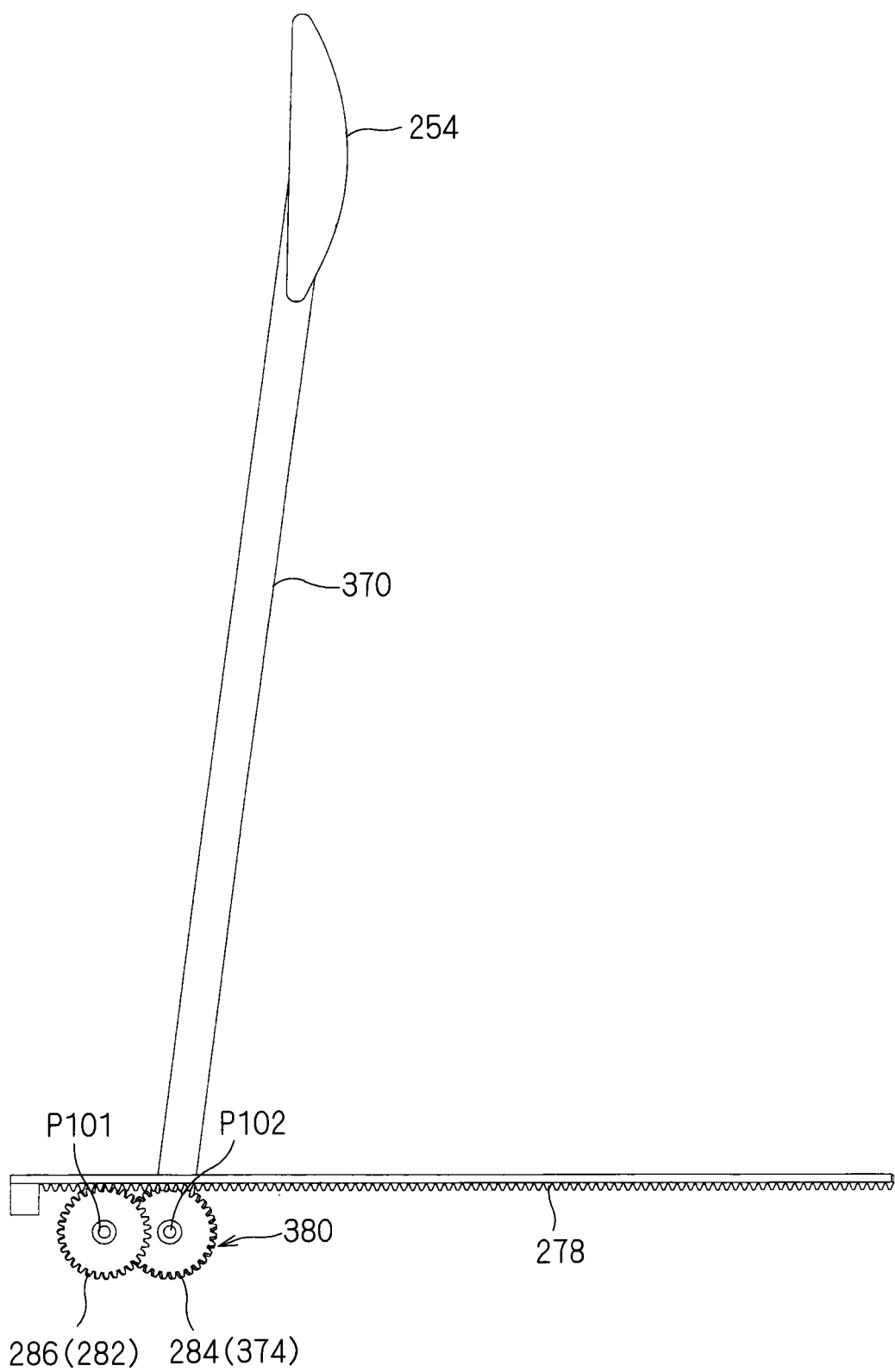
FIG. 35 is an explanatory view showing the relationship among the arm, the second gear, and the deceleration gear mechanism according to the modification.
Figure 36:
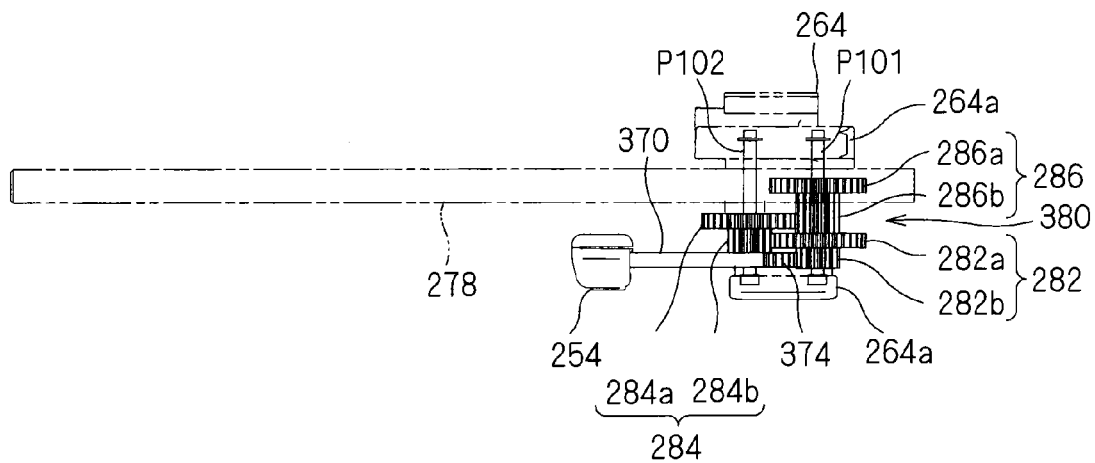
FIG. 36 is another explanatory view showing the relationship among the arm, the second gear, and the deceleration gear mechanism according to the modification.
Figure 37:
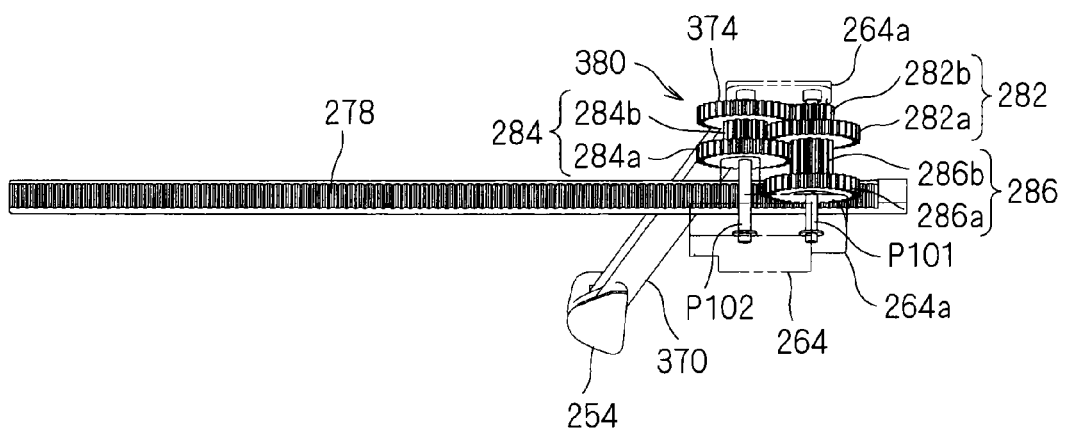
FIG. 37 is still another explanatory view showing the relationship among the arm, the second gear, and the deceleration gear mechanism according to the modification.

FIG. 34 is a side view showing the movable member 264, the arm 370, the second gear 278, and the deceleration gear mechanism 380. FIGS. 35 to 37 are each an explanatory view showing the relationship thereamong, where FIG. 35 is a view when viewed from the opposite side of FIG. 34, FIG. 36 is a view when viewed from above, and FIG. 37 is a view when viewed from obliquely below.

The deceleration gear mechanism 380 includes the first intermediate gear member 282, relay deceleration gear member 284, and second intermediate gear member 286 similar to those of the embodiment described above, and the relationship of meshing thereof is the same as that of the embodiment described above. However, the deceleration gear mechanism 380 is different from the deceleration gear mechanism 280 in the relationship of arrangement among the first intermediate gear member 282, relay deceleration gear member 284, and second intermediate gear member 286.

In other words, two pins P101 and P102 are supported between the pair of movable side pieces 264a of the movable member 264. The pins P101 and P102 are each postured to be perpendicular to the extending direction of the guide path 266P. The pins P101 and P102 are supported with an interval in the stated order from the proximal end side to the distal end side of the guide path 266P along the extending direction of the guide path 266P. The pins P101 and P102 may be each displaced in a direction (vertically) to become apart from the guide path 266P.

A part of the rotational axis of the first intermediate gear member 282, that of the relay deceleration gear member 284, and that of the second intermediate gear member 286 are disposed coaxially.

Here, the rotational axis of the first intermediate gear member 282 and the rotational axis of the second intermediate gear member 286 are disposed coaxially, and the rotational axis of the relay deceleration gear member 284 is disposed adjacent to those rotational axes.

The first intermediate gear member 282 and the second intermediate gear member 286 are supported by the pin P101 so as to rotate coaxially. The relay deceleration gear member 284 is rotatably supported by the pin P102. The first intermediate gear member 282 and the second intermediate gear member 286 are disposed on the housing direction side, and the relay deceleration gear member 284 is disposed on the drawing direction side, which are opposite to the embodiment above in positional relationship. As in the embodiment above, the second intermediate gear member 286 is disposed on the side on which it meshes with the second gear 278 in the guide path 266P, and the first intermediate gear member 282 is out of the guide path 266P and is disposed on such a side as to mesh with the first gear 374 of the arm 370.

The other end portion (lower end portion) of the arm 370 is formed into a disc shape, and gear teeth are formed around the outer periphery thereof, which form the first gear 374. The center of the first gear 374 is rotatably supported by the pin P102 and meshes with the first intermediate gear 282b of the first intermediate gear member 282. That is, the rotational axis of the first gear 374 is disposed coaxially with the rotational axis of the relay deceleration gear member 284.

The rotational axis of the first intermediate gear member 282 may be disposed coaxially with any of the rotational axes of the plurality of relay deceleration gear members 284, or first intermediate gear member 282 or second intermediate gear member 286 depending on, for example, the number of relay deceleration gear members 284 and the positional relationship between the first intermediate gear member 282 and the second intermediate gear member 286.

Figure 38:
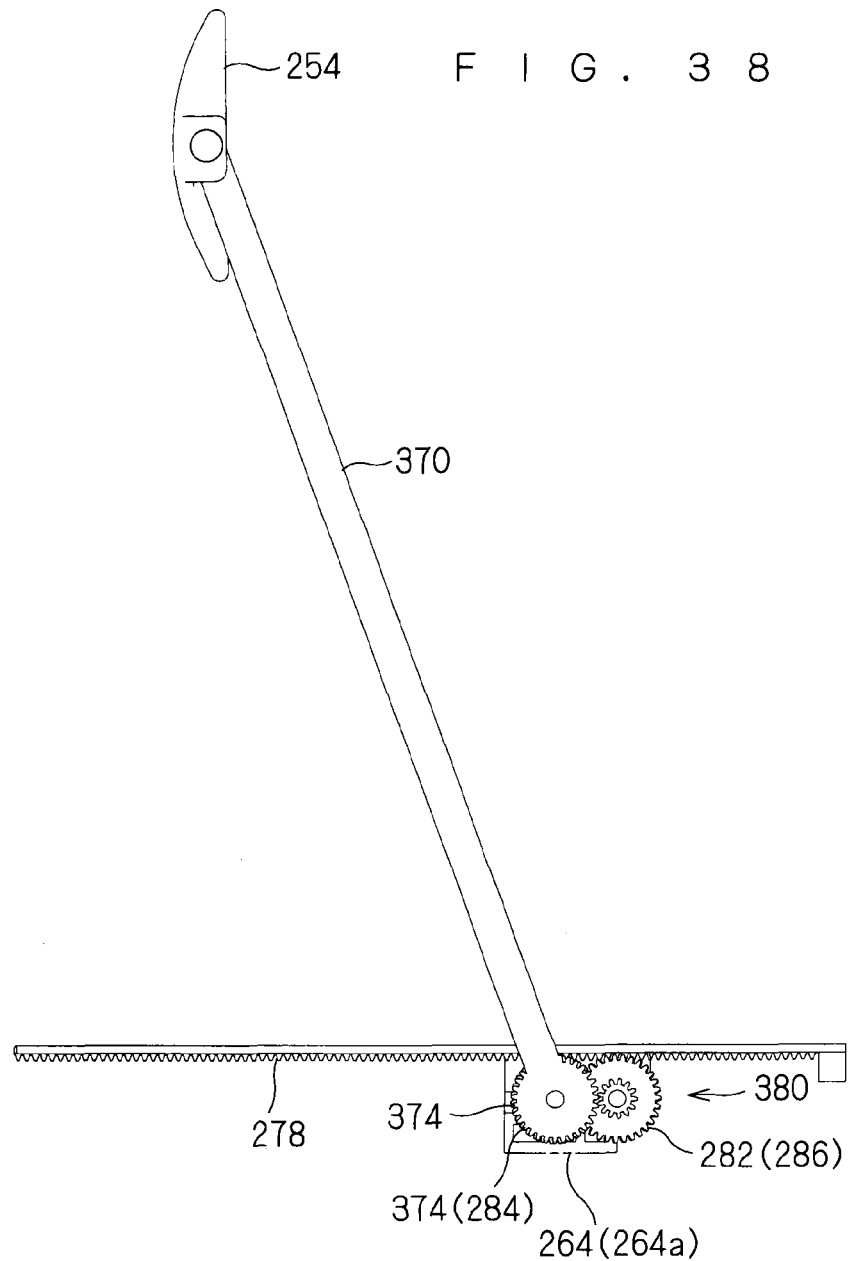
FIG. 38 is an explanatory view showing an operation in the modification.
Figure 39:
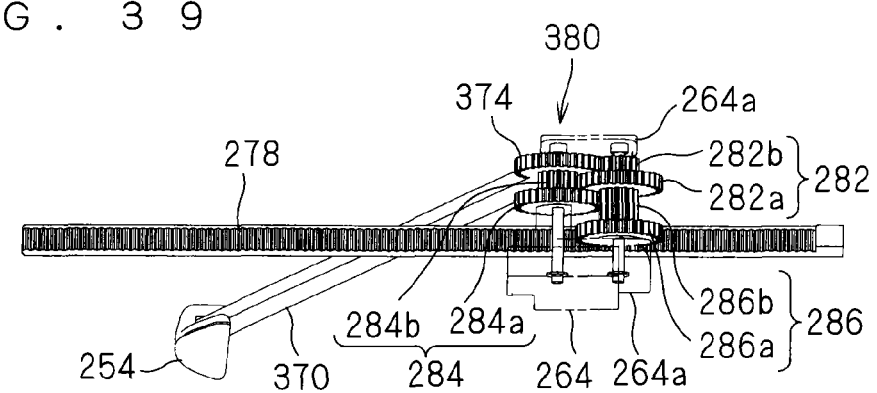
FIG. 39 is an explanatory view showing the operation in the modification.
Figure 40:
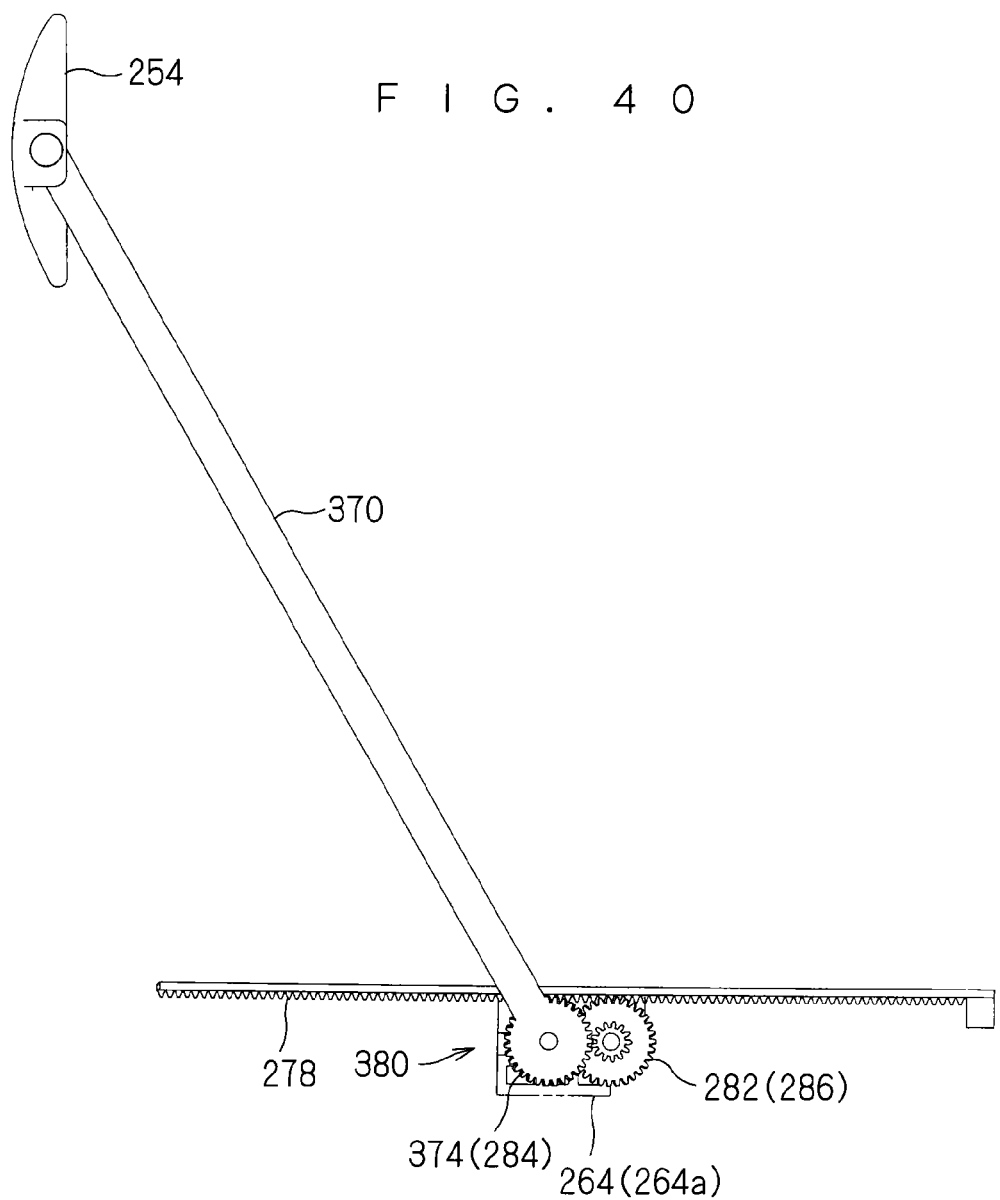
FIG. 40 is an explanatory view showing the operation in the modification.
Figure 42:
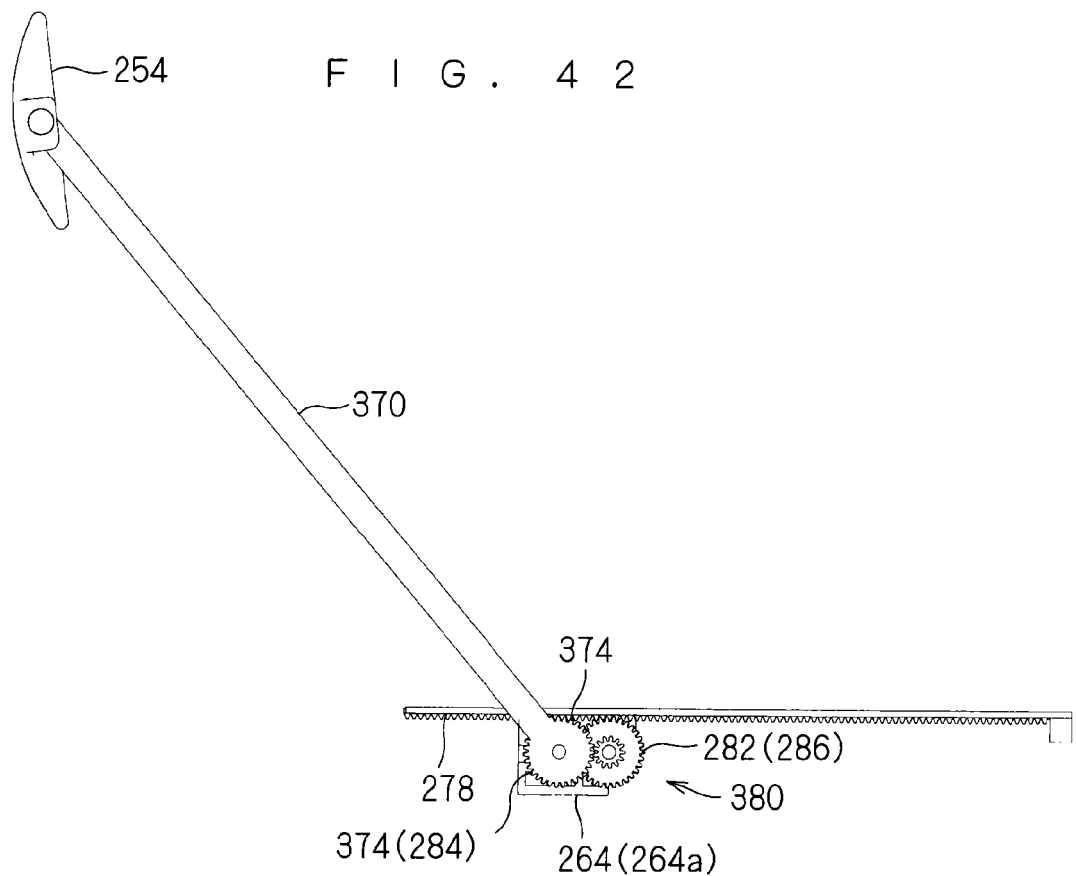
FIG. 42 is an explanatory view showing the operation in the modification.
Figure 43:
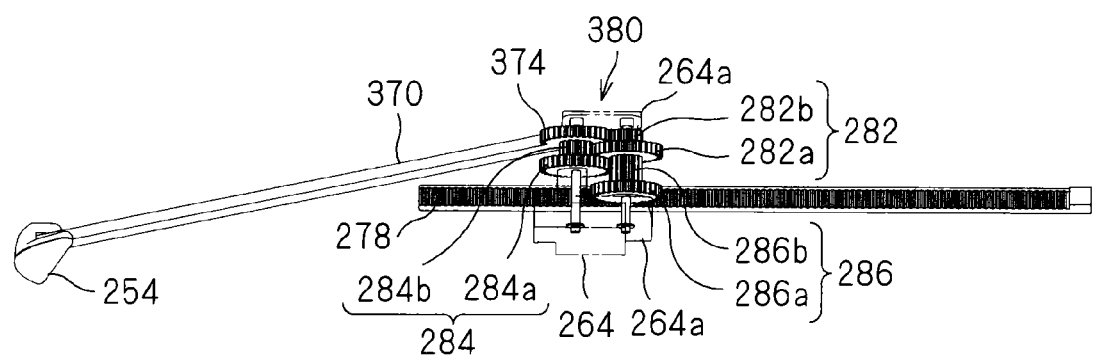
FIG. 43 is an explanatory view showing the operation in the modification.

The operation in the present modification is described. FIGS. 38, 40, and 42 are each an explanatory view of the side surface, which shows the operation of the horizontally shielding open/close mechanism 260 when the movable member 264 is moved from the housing side to the drawing side of the horizontally shielding window shade 252, and FIGS. 39, 41, and 43 are each an explanatory view, which shows this operation from obliquely below.

First, in the state in which the movable member 264 is positioned at the housing-direction-side edge portion of the horizontally shielding window shade 252 in the guide path 266P, as shown in FIGS. 34 to 37, the second intermediate gear 286a of the second intermediate gear member 286 meshes with the second gear 278 at the housing-direction-side edge portion. Further, in the state in which the first gear 374 of the arm 370 meshes with the first intermediate gear 282b of the first intermediate gear member 282, the arm 370 is in the state to be disposed along the horizontally shielding windup device 256 (that is, first posture).

From this state, the movable member 264 moves toward the drawing direction side of the horizontally shielding window shade 252 along the guide path 266P by the force via the associating mechanism 300 and the like. Then, as shown in FIGS. 38 and 39, the second intermediate gear member 286 rotates upon meshing of the second gear 278 and the second intermediate gear 286a of the second intermediate gear member 286, and this rotational movement is decelerated and transferred to the first gear 374 via the relay deceleration gear member 284 and the first intermediate gear member 282. This causes the arm 370 to change its posture from the first posture to the second posture.

Figure 41:
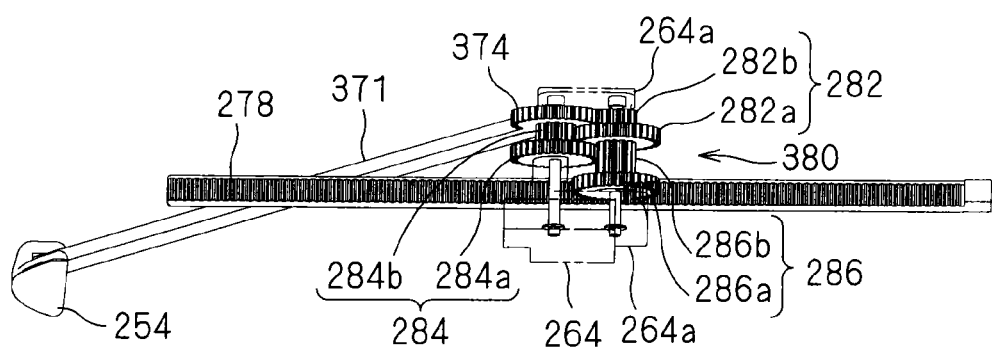
FIG. 41 is an explanatory view showing the operation in the modification.

The movable member 264 moves along the guide path 266P toward the drawing direction side of the horizontally shielding window shade 252, whereby the arm 370 further changes its posture from the first posture to the second posture as shown in FIGS. 40 and 41.

Then, as shown in FIGS. 42 and 43, the movable member 264 reaches the drawing-direction-side edge portion along the guide path 266P, in other words, the second intermediate gear member 286 reaches the drawing-direction-side end portion of the second gear 278, whereby the arm 370 has just finished the posture change to the second posture. As a result, the horizontally shielding window shade 252 is drawn so as to cover the rear quarter window 212 almost entirely. In this state, the movable member 264 is kept stopping, so that the arm 370 is kept in the second posture.

The operation of the horizontally shielding open/close mechanism 260 when the movable member 264 is moved from the drawing side to the housing side of the horizontally shielding window shade 252 is opposite to the above-mentioned operation.

Also according to the present modification, similar operation and effect to those of the embodiment above can be achieved, except for the operation and effect achieved by setting the rotational axis of the first gear 374 different from the other rotational axis.

In particular, the rotational axis of the first gear 374 and the rotational axis of the relay deceleration gear member 284 are disposed coaxially in the present modification, which enables to dispose the first gear 374 so as to mesh with the deceleration gear mechanism 380 with a more compact configuration.

It is not necessarily required to provide both of the vertically shielding window shade device 230 and the horizontally shielding window shade device 250 as in the embodiment above, and the horizontally shielding window shade 252 may be used alone. Alternatively, the configuration described as to the horizontally shielding window shade 252 may be incorporated in a window shade device that shields a window vertically and obliquely.

While the present invention has been described above in detail, the foregoing description is in all aspects illustrative, and the present invention is not limited thereto. That is, numerous modifications and variations can be devised in the described aspects without departing from the scope of the invention.

The invention claimed is:

1. A window shade device for vehicles that covers a window of a vehicle to be shielded and opened, comprising:
   a window shade configured to shield said window;
   a windup device winding up said window shade to be drawn therefrom and housed therein;
   a guide and support mechanism that includes a guide path member including a guide path along a drawing direction and a housing direction of said window shade and supports a movable member along the guide path; and
   an arm that includes a first end coupled to a drawing-direction edge portion of said window shade and a second end rotatably supported by said movable member, wherein the arm is configured to change a posture thereof between a first posture in which said first end is located on a housing direction side and a second posture in which said first end is located on a drawing direction side, wherein
   said arm includes a first gear, and said guide path includes a toothed rack extending substantially an entire length of said guide path, and
   the window shade device for vehicles further comprises a reduction gear mechanism, said movable member includes the reduction gear mechanism which is configured to mesh with each of said first gear and said toothed rack, wherein when the reduction gear mechanism meshes with said first gear and said toothed rack, a rotational movement is imparted unto the movable member to cause said arm to change the posture thereof between said first posture and said second posture.

2. The window shade device for vehicles according to claim 1, wherein said arm is formed into an approximately L-shape.

3. The window shade device for vehicles according to claim 1, wherein:
   said reduction gear mechanism includes a first intermediate gear member including a first intermediate gear that meshes with said first gear, a second intermediate gear member including a second intermediate gear that meshes with said toothed rack, and at least one relay reduction gear member that is provided between said first intermediate gear member and said second intermediate gear member and imparts the rotational movement on said second intermediate gear member to transfer the rotational movement to said first intermediate gear member, parts of the rotational axes thereof being disposed coaxially, and
   said reduction gear mechanism imparts and transfers, via said relay reduction gear member, the rotational movement of said second intermediate gear member upon meshing of said toothed rack and said second intermediate gear as the rotational movement for causing said arm to change the posture thereof between said first posture and said second posture upon meshing of said first intermediate gear and said first gear.

4. The window shade device for vehicles according to claim 3, wherein
said toothed rack is provided so as to mesh with said second intermediate gear for the entire length of the guide path through which the movable member moves, and
said reduction gear mechanism is set to have a degree of deceleration for causing said arm to change the posture thereof from said first posture to said second posture and vice versa upon movement of said movable member through the whole of said guide path.

5. The window shade device for vehicles according to claim 3, wherein among the rotational axis of said first intermediate gear member, the rotational axis of said second intermediate gear member, and the rotational axis of said at least one relay reduction gear member, two of the three axes are configured to be coaxially disposed and a remaining axis of the three axes is offset from the other two.

6. The window shade device for vehicles according to claim 3, wherein said first intermediate gear member, said second intermediate gear member, and said at least one relay reduction gear member are each obtained by integrating a large-diameter gear and a small-diameter gear so as to be coaxially centered, and all three gears mesh with each other in sequence and are configured to decelerate and transfer the rotational movement.

7. The window shade device for vehicles according to claim 3, wherein the rotational axis of said first intermediate gear member and the rotational axis of said second intermediate gear member are disposed coaxially.

8. The window shade device for vehicles according to claim 3, wherein the rotational axis of said first gear is disposed at a position different from those of the rotational axes of said first intermediate gear member, said second intermediate gear member, and said at least one relay reduction gear member.

9. The window shade device for vehicles according to claim 8, wherein the rotational axis of said first gear is disposed at a position spaced from the rotational axes of said first intermediate gear member, said second intermediate gear member, and said at least one relay reduction gear member along said guide path.

10. The window shade device for vehicles according to claim 3, wherein the rotational axis of said first gear is disposed coaxially with at least one of the rotational axes of said first intermediate gear member, said second intermediate gear member, and said at least one relay reduction gear member.

* * * * *